US009378593B2

(12) United States Patent
Chhugani et al.

(10) Patent No.: US 9,378,593 B2
(45) Date of Patent: Jun. 28, 2016

(54) GARMENT SIMULATION USING THREAD AND DATA LEVEL PARALLELISM

(71) Applicant: eBay Inc., San Jose, CA (US)

(72) Inventors: Jatin Chhugani, Santa Clara, CA (US); Jonathan Su, San Jose, CA (US); Mihir Naware, Redwood City, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 14/530,636

(22) Filed: Oct. 31, 2014

(65) Prior Publication Data

US 2015/0130795 A1    May 14, 2015

Related U.S. Application Data

(60) Provisional application No. 61/904,263, filed on Nov. 14, 2013, provisional application No. 61/905,126, filed on Nov. 15, 2013, provisional application No. 61/904,522, filed on Nov. 15, 2013, provisional application No. 61/905,118, filed on Nov. 15, 2013, provisional application No. 61/905,122, filed on Nov. 15, 2013.

(51) Int. Cl.
*G06T 19/20* (2011.01)
*G06Q 30/06* (2012.01)
(Continued)

(52) U.S. Cl.
CPC ............ *G06T 19/20* (2013.01); *G06F 17/5009* (2013.01); *G06K 9/6262* (2013.01); *G06Q 30/0643* (2013.01); *G06T 7/004* (2013.01); *G06T 15/005* (2013.01); *G06T 17/00* (2013.01); *G06T 17/10* (2013.01); *G06T 17/20* (2013.01); *G06T 19/00* (2013.01); *A41H 3/007* (2013.01);
(Continued)

(58) Field of Classification Search
None
See application file for complete search history.

(56) References Cited

U.S. PATENT DOCUMENTS 7,242,999 B2    7/2007  Wang
7,308,332 B2   12/2007  Okada et al.
(Continued)

FOREIGN PATENT DOCUMENTS

EP             2091015 A1    8/2009

OTHER PUBLICATIONS

"U.S. Appl. No. 14/474,003, Preliminary Amendment filed Oct. 3, 2014", 3 pgs.
(Continued)

*Primary Examiner* — Said Broome
(74) *Attorney, Agent, or Firm* — Schwegman, Lundberg & Woessner, P.A.

(57) ABSTRACT

Techniques for three-dimensional garment simulation using parallel computing are presented herein. An access module can be configured to access a three-dimensional garment model of a garment. The garment model can include garment points that represent a surface of the garment. A processor, having a plurality of cores, can be configured by a garment simulation module to calculate one or more exerted forces on a subset of garment points. Additionally, the garment simulation module can generate cross pairs and apportion the generated cross pairs among the plurality of cores. Moreover, the garment simulation module can determine, using the plurality of vector execution units in parallel based on an organized data layout, whether boundaries of the first subgroup of cross pairs are overlapping based on the one or more exerted forces. Subsequently, the garment simulation module can calculate one or more simulated forces acting on the garment points based on the determination.

20 Claims, 18 Drawing Sheets

(51) Int. Cl.
  *G06T 15/00* (2011.01)
  *G06T 17/20* (2006.01)
  *G06F 17/50* (2006.01)
  *G06T 17/00* (2006.01)
  *G06T 19/00* (2011.01)
  *G06K 9/62* (2006.01)
  *G06T 7/00* (2006.01)
  *G06T 17/10* (2006.01)
  *A41H 3/00* (2006.01)

(52) U.S. Cl.
  CPC ......... *G06F 2217/04* (2013.01); *G06F 2217/32* (2013.01); *G06T 2210/16* (2013.01)

(56) References Cited

U.S. PATENT DOCUMENTS

| | | | |
|---|---|---|---|
| 7,398,133 | B2 | 7/2008 | Wannier et al. |
| 7,548,794 | B2 | 6/2009 | Vandergriff et al. |
| 7,714,912 | B2 | 5/2010 | Faisman et al. |
| 8,359,247 | B2 | 1/2013 | Vock |
| 8,525,828 | B1 | 9/2013 | Bates |
| 2004/0083142 | A1 | 4/2004 | Kozzinn |
| 2008/0312765 | A1 | 12/2008 | Gardiner et al. |
| 2010/0049633 | A1 | 2/2010 | Wannier et al. |
| 2011/0231278 | A1 | 9/2011 | Fries |
| 2012/0054059 | A1 | 3/2012 | Rele |
| 2012/0309520 | A1* | 12/2012 | Evertt ............ A63F 13/10 463/31 |
| 2013/0268399 | A1 | 10/2013 | Lu et al. |
| 2014/0129390 | A1 | 5/2014 | Mauge et al. |
| 2015/0134302 | A1 | 5/2015 | Chhugani et al. |
| 2015/0134493 | A1 | 5/2015 | Su et al. |
| 2015/0134494 | A1 | 5/2015 | Su et al. |

OTHER PUBLICATIONS

"Styku Startup Revolutionizes Apparel Shopping, Reduces Returns with Virtual Fitting Room", Microsoft Case Study: Microsoft Kinect for Windows—Styku, [Online]. Retrieved from the Internet: <URL: http://www.microsoft.com/casestudies/Microsoft-Kinect-for-Windows/Styku/Startup-Revolutionizes-Apparel-Shopping-Reduces-Returns-with-Virtual-Fitting-Roo...>, (Nov. 6, 2012), 7 pgs.

Basenese, Louis, "Virtual Fitting Rooms . . . Coming to a Store Near You", Wall Street Daily, [Online]. Retrieved from the Internet: <URL: http://www.wallstreetdaily.com/2011/07/07/virtual-fitting-rooms-fits-me/print/>, (Aug. 13, 2014), 2 pgs.

Binkley, Christina, "The Goal: a Perfect First-Time Fit: True Fit is Online Retailers' Latest Attempt to Help Consumers Buy Right Size; No Tape Measures", Achieving a Perfect Fit in Online Shopping—WSJ, [Online]. Retrieved from the Internet: <URL: http://online.wsj.com/news/articles/SB10001424052702304724404577293593210807790#printMode>, (Mar. 23, 2012), 4 pgs.

Bryant, Martin, "Fits.me Launches Robot to Help Women Size Up Clothes Online", [Online]. Retrieved from the Internet: <URL: http://thenextweb.com/eu/2011/06/10/fits-me-launches-robot-to-help-women-size-up-clothes-online/>, (Jun. 10, 2011), 4 pgs.

Chang, Andrea, "Virtual Fitting Rooms Changing the Clothes Shopping Experience", Los Angeles Times, [Online]. Retrieved from the Internet: <URL: http://articles.latimes.com/print/2012/jul/13/business/la-fi-virtual-dressing-room-20120714>, (Jul. 13, 2012), 2 pgs.

Kristensen, Kasper, et al., "Towards a Next Generation Universally Accesible 'Online Shopping-for-Apparel' System", Human-Computer Interaction, Part III, HCII 2013, LNCS 8006, (2013), 418-427.

O'Brien, Terrence, "Fits.me—Imitates Ladies of All Shapes and Sixes, Tries Clothes on for you (video)", [Online]. Retrieved from the Internet: <URL: http://www.engadget.com/2011/06/13/fits-me-imitates-ladies-of-all-shapes-and-sizes-tries-clothes-o/>, (Accessed Aug. 13, 2014), 10 pgs.

Rudolph, Larry, et al., "A Simple Load Balancing Scheme for Task Allocation in Parallel Machines", ACM, (1991), 237-245.

Satish, N, et al., "IEEE Xplore Abstact—Can traditional programming bridge the Ninja performance gap for parallel computing applications?", 39th Annual ISCA, [Online]. Retrieved from the Internet: <URL: http://ieeexplore.ieee.org/xpl/articleDetails.jsp?reload=true&arnumber=6237038>, (2012), 3 pgs.

U.S. Appl. No. 14/474,003, filed Aug. 29, 2014, Extraction of Body Dimensions From Planar Garment Photographs of Fitting Garments.
U.S. Appl. No. 14/270,244, filed May 5, 2014, 3-Dimensional Digital Garment Creation From Planar Garment Photographs.
U.S. Appl. No. 14/449,120, filed Jul. 31, 2014, Three-Dimensional Digital Media Content Creation From High-Fidelity Simulation.
U.S. Appl. No. 14/503,309, filed Sep. 30, 2014, Garment Size Mapping.

\* cited by examiner

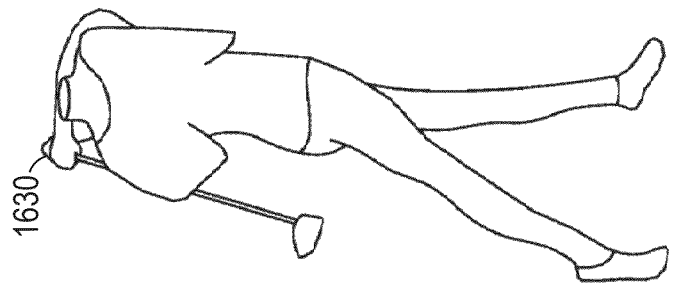
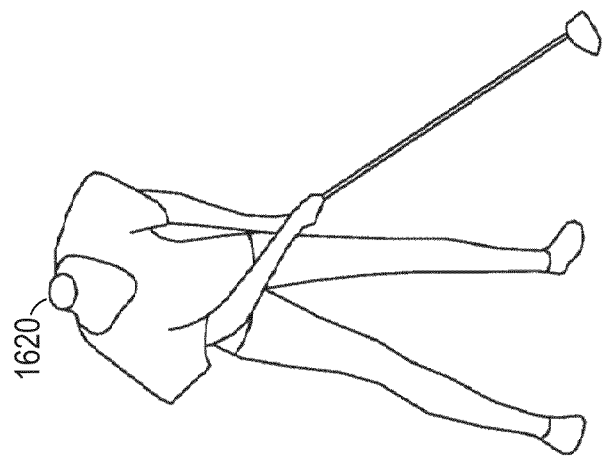
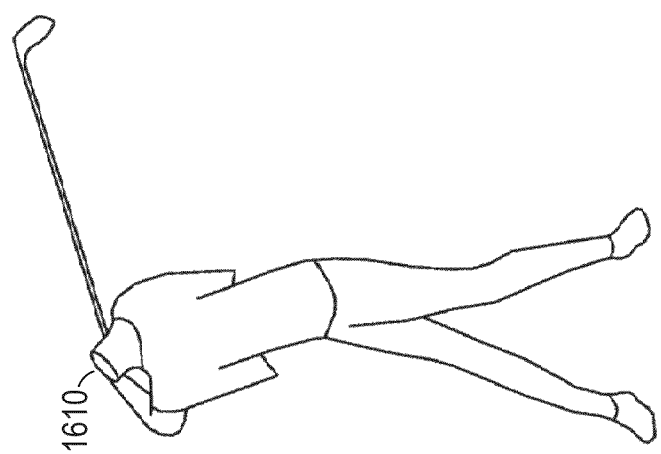
FIG. 16

GARMENT SIMULATION USING THREAD AND DATA LEVEL PARALLELISM

This application claims the priority benefit of: (1) U.S. Provisional Application No. 61/905,126, filed Nov. 15, 2013; (2) U.S. Provisional Application No. 61/904,263, filed Nov. 14, 2013; (3) U.S. Provisional Application No. 61/904,522, filed Nov. 15, 2013; (4) U.S. Provisional Application No. 61/905,118, filed Nov. 15, 2013; and (5) U.S. Provisional Application No. 61/905,122, filed Nov. 15, 2013, which applications are incorporated herein by reference in their entirety.

TECHNICAL FIELD

The present application relates generally to the technical field of three-dimensional (3-D) modeling and simulation and, in one specific example, to 3-D garment simulation using parallel computing.

BACKGROUND

Shopping for clothes in physical stores can be an arduous task and, due to travelling and parking, can be very time consuming. With the advent of online shopping, consumers may purchase clothing, while staying home, via a computer or any electronic device connected to the Internet. Additionally, purchasing clothes online can be different in comparison to purchasing clothes in a store. One difference is the lack of a physical dressing room to see if and how an article of clothing fits the particular consumer. Since different consumers can have different dimensions, seeing how an article of clothing fits, by use of a dressing room, can be a very important aspect of a successful and satisfying shopping experience. To support the plurality of garments available and the large numbers of customers who might buy them, a high-fidelity simulation system is required, with the requisite parallel computing capabilities to handle the workload in a scalable, time-efficient, and cost-efficient manner.

The systems and methods described in the present disclosure attempt to provide solutions to the problems presented above.

BRIEF DESCRIPTION OF THE DRAWINGS

FIG. 16 illustrates how the garment looks and feels by demonstrating a lifestyle presentation, in accordance with example embodiments.

DESCRIPTION OF EMBODIMENTS

Figure 1:
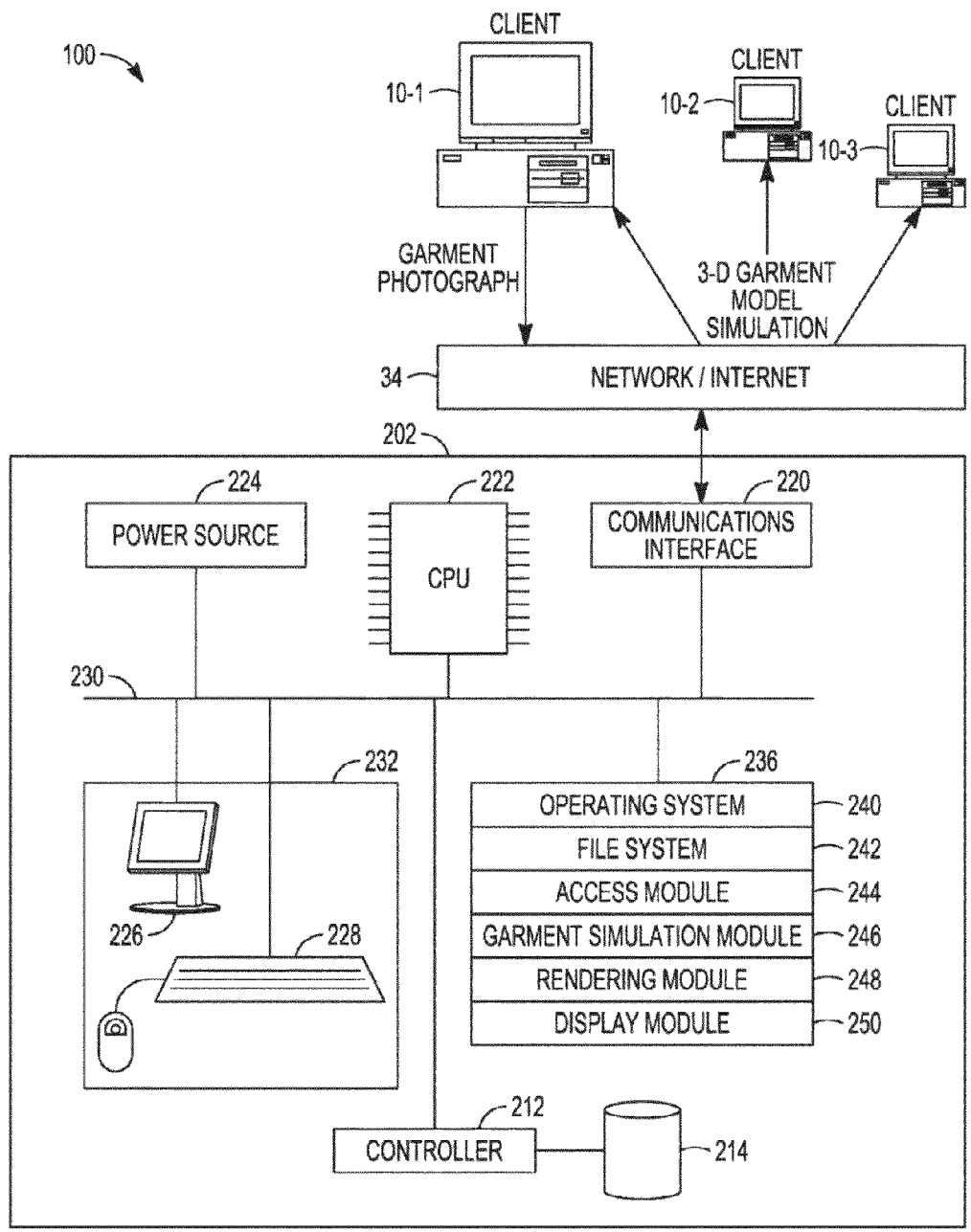
FIG. 1 illustrates an example system for three-dimensional (3-D) digital garment creation from planar garment photographs, in accordance with example embodiments.

Techniques for efficient parallelization of garment simulations are provided herein. A garment simulation can be broken down in discrete time steps over a period of time (e.g., $T_1$ to $T_2$). Each time step of the simulation can receive as input the state of a garment (e.g., vertex positions of the garment, connectivity of the vertices to form a mesh corresponding to the garment, the velocity of the vertices, acceleration of the vertices, and external forces acting on the garment) and output the state of the garment based on simulated forces acting on the garment. For example, for a garment with M vertices, a garment simulation module can store and calculate the M position vectors, M velocity vectors, M acceleration vectors, and M force vectors. The calculation can be done in parallel using a plurality of cores and a plurality of vector execution units.

Each time step can include a forward time integration followed by a collision resolution. First, the forward time integration can include calculating exerted forces on the vertices. Then, the collision resolution can include performing a collision detection test based on the forward time integration, and resolving a detected collision.

For example, a garment simulation module can have a collision detection module for collision resolution and a forward time integration module for forward time integration. The garment simulation module can employ a semi-implicit integration scheme that uses explicit integration for position updates and implicit solvers for velocity updates. A collision resolution algorithm can then detect and attempt to resolve collision of the cloth with itself or other objects in the vicinity.

In accordance with example embodiments, the forward time integration module can organize (e.g., reorganize) a data layout of the garment points (e.g., vertices) for parallel computing. Additionally, the forward time integration module can determine, using the plurality of vector execution units in parallel, an exerted force on the garment points based on the organized data layout of the garment points. The plurality of vector execution units can be a single instruction multiple data (SIMD). Furthermore, the forward time integration module can calculate, using the plurality of cores in parallel, simulated forces acting on the garment points based on the determined exerted force on the garment points.

Subsequently, the collision detection module can perform a collision detection test. The collision detection test can include generating a first hierarchy and a second hierarchy, the first hierarchy having a first set of nodes associated with the garment points. Additionally, cross pairs can be generated by intersecting the first set of nodes with a second set of nodes from the second hierarchy. The collision detection test further includes a hierarchy intersection test on the generated cross pairs, which may be performed using the plurality of cores in parallel. Then, the collision detection test includes an overlap test for the generated cross pairs, which may be performed using the plurality of vector execution units in parallel. A collision can be detected based on the hierarchy intersection test and the overlap test. Furthermore, the detected collision can be resolved by the collision detection module.

In some instances, the collision detection module and the forward time integration module can take the majority of processing time (e.g., more than 99%) for a three-dimensional garment simulation by the garment simulation module.

Techniques described herein can exploit the multiple cores and vector execution units using thread-level and data-level algorithms to speed up the processing time of the garment simulation. Thread-level algorithms may be associated with the multiple cores of a processor. Data-level algorithms may be associated with the vector execution units of the processor.

Example techniques for simulating a three-dimensional (3-D) garment model by using multiple cores and vector execution units are described. Simulating the 3-D garment model can include draping the garment model on a 3-D body model, determining the force in the garment draped on a body, and presenting the garment flows as the body performs actions.

The simulation can done by placing the garment model on the body model, running a physically accurate physics-based simulation that advances the position and other related variables of the vertices of the garment model while obeying the laws of physics, garment material properties, and body-garment interactions. The simulations can be done using thread-level and data-level algorithms to speed up the processing time of the garment simulation.

Parallel processing using vector execution units (e.g., SIMD) can be done by reorganizing a data layout associated with the garment points, and mapping a scalar implementation to a vector execution. SIMD can be a class of instructions that perform basic mathematical operations on vector registers by operating the specific operation on each individual scalar lane of the register to produce the desired vector register.

Additionally, S can represent the SIMD width (e.g., number of scalar lanes that is based on length of each operand). In some instances, when S is four floating point values, the SIMD can calculate a Y vector by adding two vectors (e.g., $X_1$ and $X_2$). For example, let $X1=[3, 5, 7, -1]$ and $X2=[4, 12, 6, 3]$. Then $Y=(X1+X2)=[(3+4), (5+12), (7+6), (-1+3)]=[7, 17, 13, 2]$.

On modern processors (e.g., CPUs, and GPUs), these operations have a throughput of one vector operation/cycle with dedicated compute pipes, and can hence speed up the computation by a factor of equal to the SIMD width for a large subset of the computation.

For the data layout, some architectures have instructions to collect data values from non-contiguous locations into a single vector register. Such instructions, known as "gather" instructions, are high-latency and low-throughput instructions. Accordingly, these instructions can adversely affect the vector scalability of computation. Hence one needs to perform modifications to data layout so that elements that need to be acted upon using vector execution unit instructions are also laid out in a contiguous fashion using vector load instructions.

In addition to the data layout, mapping out the execution in a vector form is important for parallel processing using vector execution units. For mapping a scalar algorithm/implementation to a vector execution, the output from a specific execution can be fed as input to the next step of the algorithmic execution. Although compilers have evolved to map straightforward computation patterns from scalar to vector, the compilers still lack in detecting complicated patterns, which is described herein.

Furthermore, modern processors provide multiple execution cores, each with independent computational blocks, caches, and so on. Moreover, the main memory can be accessed by each of these cores.

For parallel processing using multi-core execution, the garment simulation module can algorithmically break down the computation into tasks that can then be executed on the plurality of cores. In order to increase efficiency, the garment simulation module can decompose the work into independent tasks, so that the execution can happen without any communication between the cores, except the mandatory barrier or sync at the end of the process. In addition, it is important to decompose the work so that each processor obtains about an equal share of the total work. In our hierarchy intersection example, the garment simulation module breaks the node-node intersection into a multiple of C (e.g., number of cores in a processor) tasks by traversing each of the two input trees down a certain depth, and then enqueuing all possible cross pair of nodes in the two trees at that depth as potential tasks.

Exploiting the sparse matrix-vector multiplication (SpMV) during the forward time integration process is another technique for efficient parallel processing using multi-core execution. For example, since the number of non-zero columns in each row is similar, the forward time integration module can divide the work almost evenly by dividing the number of rows by the number of cores (C), and assigning each processor the same number of rows. In practice, the system can achieve near-linear core-scaling with this subdivision scheme.

Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Reference will now be made in detail to various example embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the example embodiments.

FIG. 1 is a block diagram illustrating a system 100 in accordance with example embodiments. The system 100 includes client devices (e.g., a client device 10-1, a client device 10-2, a client device 10-3) connected to a server 202 via a network 34 (e.g., the Internet). The server 202 typically includes one or more processing units (CPUs) 222 for executing modules, programs, or instructions stored in a memory 236 and thereby performing processing operations; one or more communications interfaces 220; the memory 236; and one or more communication buses 230 for interconnecting these components. The communication buses 230 optionally include circuitry (e.g., a chipset) that interconnects and controls communications between system components. The server 202 also optionally includes a power source 224 and a controller 212 coupled to a mass storage 214. The system 100 optionally includes a user interface 232 comprising a display device 226 and a keyboard 228.

The memory 236 includes high-speed random access memory, such as dynamic random-access memory (DRAM), static random-access memory (SRAM), double data rate random-access memory (DDR RAM), or other random-access solid state memory devices; and may include non-volatile memory, such as one or more magnetic disk storage devices, optical disk storage devices, flash memory devices, or other non-volatile solid state storage devices. The memory 236 may optionally include one or more storage devices remotely located from the CPU 222. The memory 236, or alternately the non-volatile memory device within the memory 236, comprises a non-transitory computer-readable storage medium. In some example embodiments, the memory 236, or the computer-readable storage medium of the memory 236, stores the following programs, modules and data structures, or a subset thereof: an operating system 240; a file system 242; an access module 244; a garment simulation module 246; a rendering module 248; and a display module 250.

The operating system 240 can include procedures for handling various basic system services and for performing hardware-dependent tasks. The file system 242 can store and organize various files utilized by various programs. The access module 244 can communicate with client devices (e.g., the client device 10-1, the client device 10-2, and the client device 10-3) via the one or more communications interfaces 220 (e.g., wired, wireless), the network 34, other wide area networks, local area networks, metropolitan area networks, and so on. Additionally, the access module 244 can access information for the memory 236 via the one or more communication buses 230.

The garment simulation module 246 can access a three-dimensional body model based on the body measurement of a person. Additionally, the garment simulation module 246 can position the body model inside the garment model. The garment model can be accessed at operation 410, illustrated as part of method 400 of FIG. 4, which is explained in detail below. Moreover, the garment simulation module 246 can calculate simulated forces acting on garment points associated with the garment model based on the positioning of the body model inside the garment model. Using the calculated simulated forces, a fit map can be determined. The fit map can be used to tell a user the recommend size to wear based on the determination.

The rendering module 248 can generate an image of the three-dimensional garment model draped on the three-dimensional body model based on the calculated one or more simulated forces. The simulated forces can be calculated based on methods (e.g., three-spring implementation of a sample triangle with three vertices) described herein.

The display module 250 can be configured to cause presentation of the generated image on a display of a device. For example, the display module 250 can present the three-dimensional simulation on the display of a mobile device. The three-dimensional simulation can be based on the actions of the garment simulation module 246 and the rendering module 248.

The network 34 may be any network that enables communication between or among machines, databases, and devices (e.g., the server 202 and the client device 10-1). Accordingly, the network 34 may be a wired network, a wireless network (e.g., a mobile or cellular network), or any suitable combination thereof. The network 34 may include one or more portions that constitute a private network, a public network (e.g., the Internet), or any suitable combination thereof. Accordingly, the network 34 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a Wi-Fi network or a WiMAX network), or any suitable combination thereof. Any one or more portions of the network 34 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

The server 202 and the client devices (e.g., the client device 10-1, the client device 10-2, and the client device 10-3) may each be implemented in a computer system, in whole or in part, as described below with respect to FIG. 18.

Any of the machines, databases, or devices shown in FIG. 1 may be implemented in a general-purpose computer modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below with respect to FIG. 18. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

Figure 2:
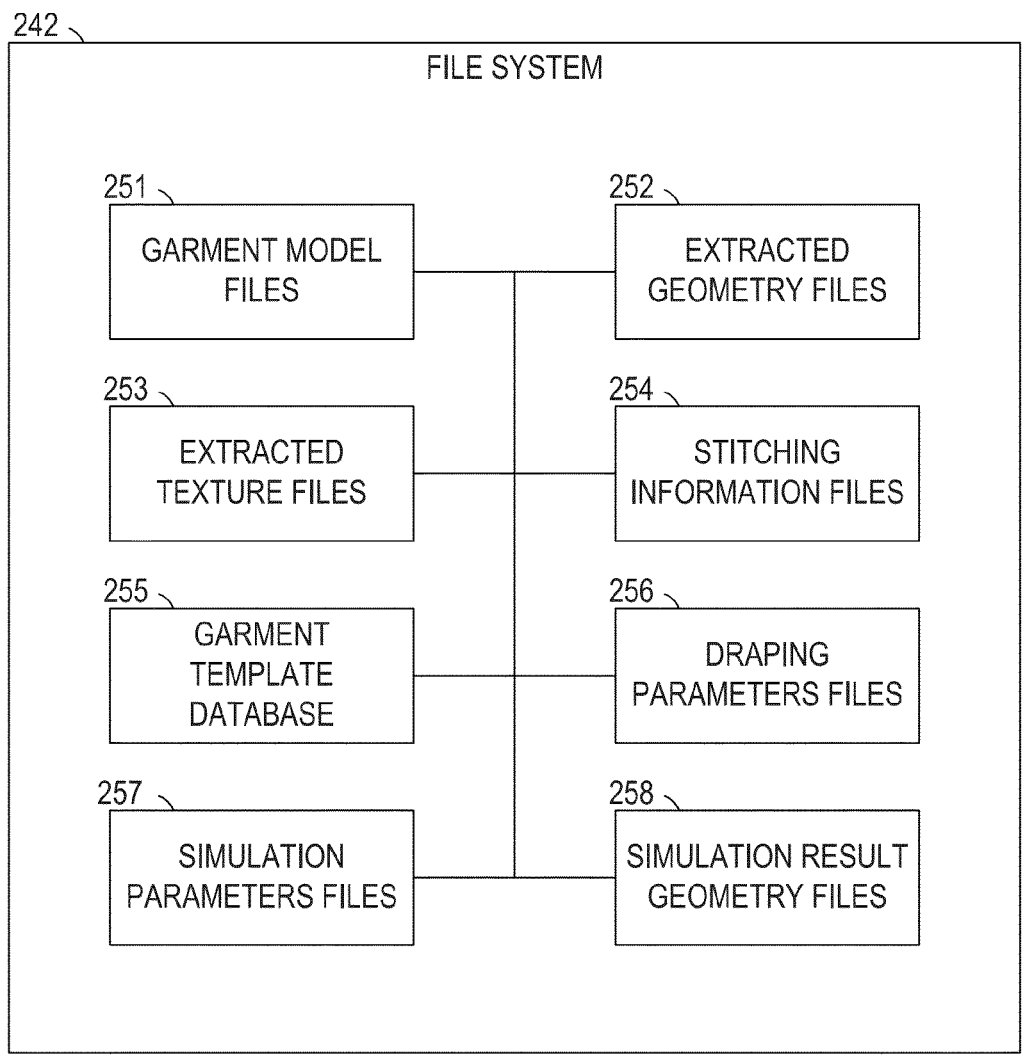
FIG. 2 is a block diagram illustrating an example file system, in accordance with example embodiments.
Figure 4:
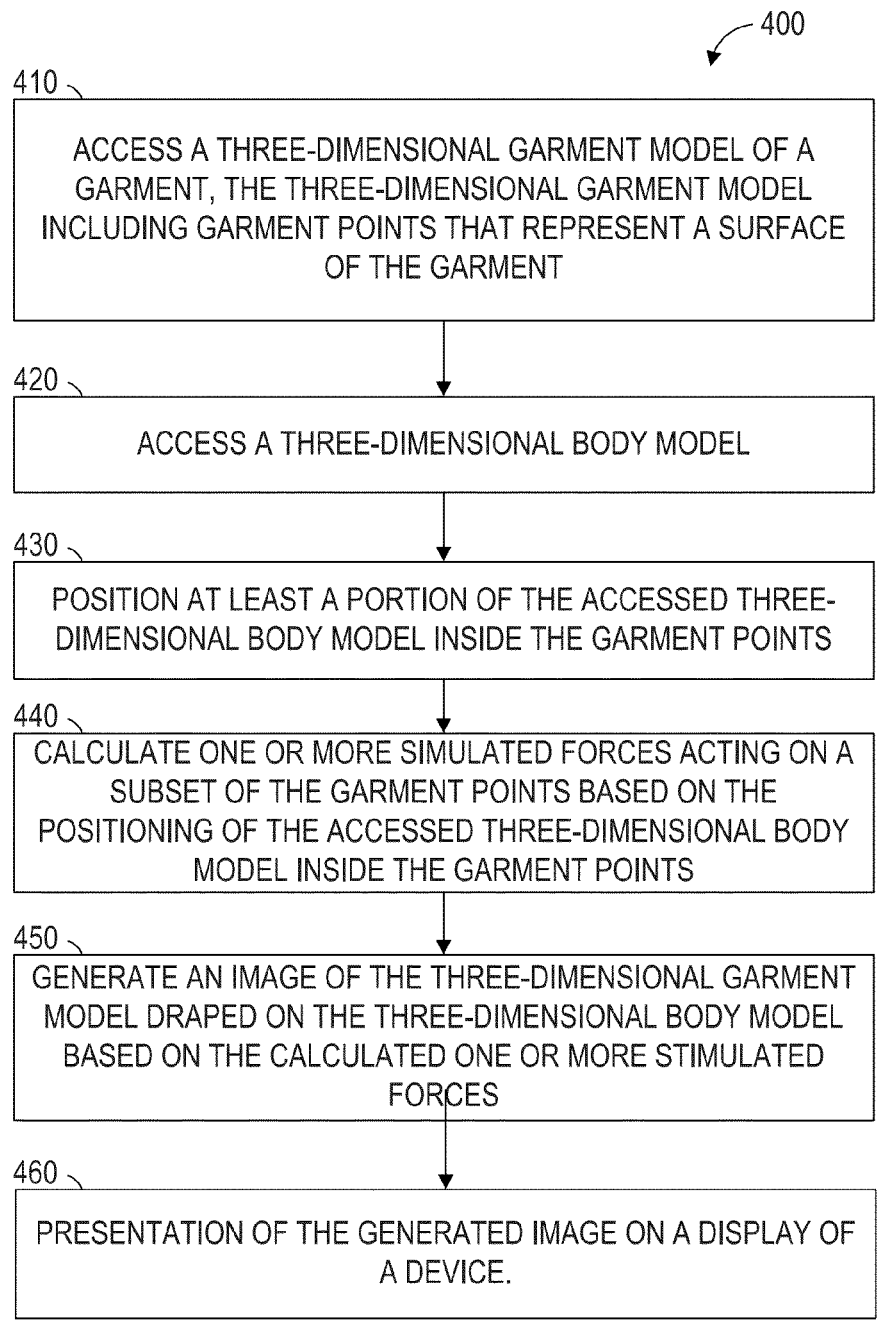
FIG. 4 is a flow diagram of a process for 3-D digital media content simulation, according to certain example embodiments.

FIG. 2 further describes the memory 236 in the server 202, as initially described in FIG. 1. Specifically, FIG. 2 includes an expanded depiction of the file system 242. The file system 242 may include one or more of the following files: garment model files 251; extracted geometry files 252; extracted texture files 253; stitching information files 254; a garment template database 255; draping parameters files 256; simulation parameters files 257; and simulation result geometry files 258. FIG. 4 further describes operations using the files from FIG. 2.

Figure 3:
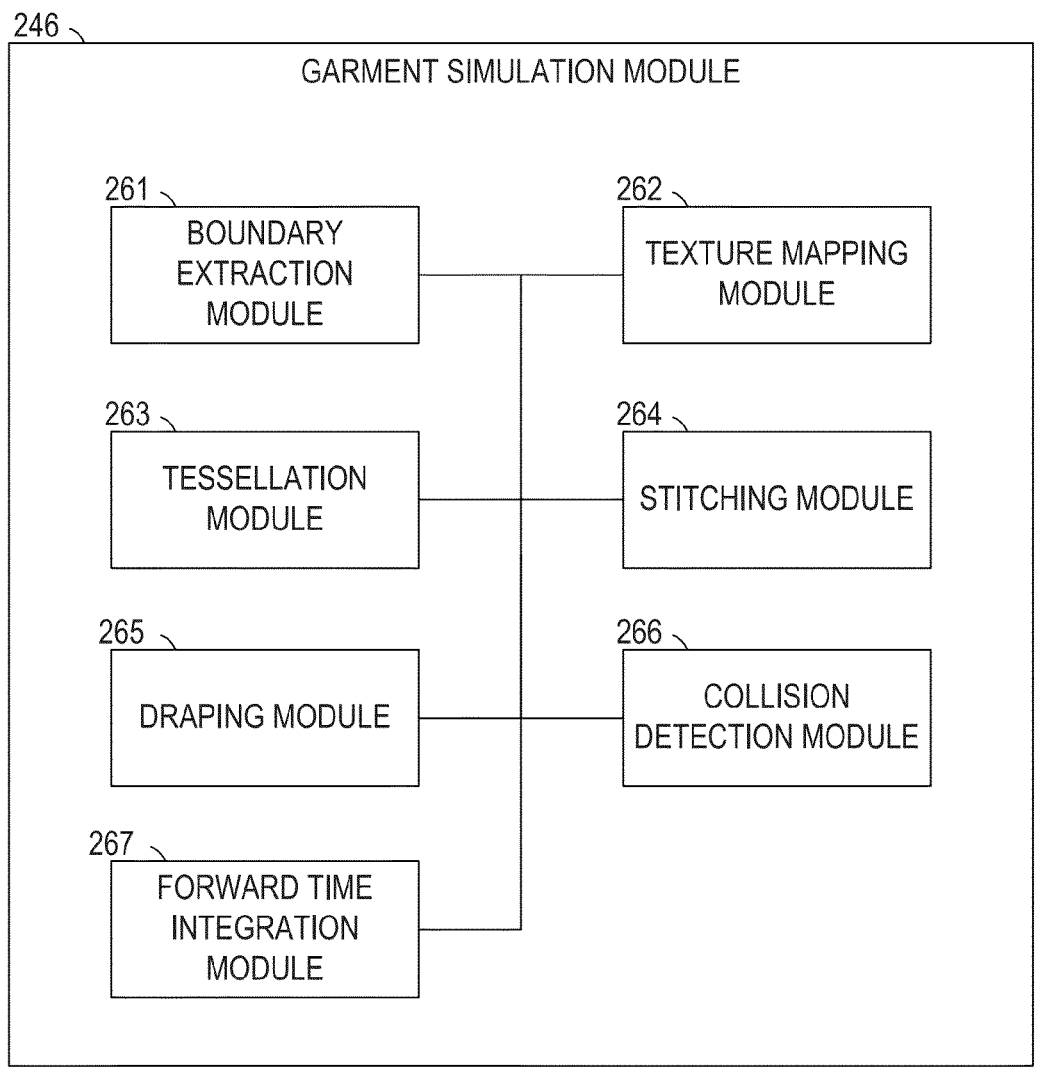
FIG. 3 is a block diagram illustrating an example garment simulation module, in accordance with example embodiments.

FIG. 3 is a block diagram illustrating components of the garment simulation module 246, according to some example embodiments, as initially described in FIG. 1. The garment simulation module 246 is shown as including a boundary extraction module 261; a texture mapping module 262; a tessellation module 263; a stitching module 264; a draping module 265; a collision detection module 266; and a forward time integration module 267, all configured to communicate with each other (e.g., via a bus, shared memory, or a switch).

Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Each of the above identified elements may be stored in one or more of the previously mentioned memory devices, and corresponds to a set of instructions for performing a function described above. The above identified modules or programs (e.g., sets of instructions) need not be implemented as separate software programs, procedures, or modules, and thus various subsets of these modules may be combined or otherwise rearranged in various example embodiments. In some example embodiments, the memory 236 may store a subset of the modules and data structures identified above. Furthermore, the memory 236 may store additional modules and data structures not described above.

The actual number of servers used to implement the garment simulation module 246 and how features are allocated among them will vary from one implementation to another, and may depend in part on the amount of data traffic that the system 100 handles during peak usage periods as well as during average usage periods.

FIG. 4 is a flowchart representing a method 400 for three-dimensional digital media content simulation, according to example embodiments. The method 400 is governed by instructions stored in a computer-readable storage medium and that are executed by one or more processors of one or more servers. Each of the operations shown in FIG. 4 may correspond to instructions stored in a computer memory or computer-readable storage medium.

Operations in the method 400 may be performed by the server 202, using modules described above with respect to FIGS. 1-3. As shown in FIG. 4, the method 400 includes operations 410, 420, 430, 440, 450, and 460. Optionally, the method 400 can include an operation for determining the size of the garment and an operation for applying a fit map to the garment.

At operation 410, the access module 244 can access, from a database, a three-dimensional garment model of a garment, the three-dimensional garment model including garment points that represent a surface of the garment. The garment model can be received using the communications interface 220 via the network 34. The accessed three-dimensional garment model of a garment can be stored in the garment model files 251.

For example, the accessed three-dimensional garment model can be a tessellated three-dimensional garment model. The tessellated three-dimensional garment model can includes a group of vertices that are garment points on the surface of the garment. The garment points can be generated using a tessellation technique by the tessellation module 263.

Tessellation can tile a garment into many tessellated geometric shapes to generate the tessellated garment with garment points. The tessellated geometric shapes can be stored in the extracted geometry files 252. Optionally, when texture information is obtained from the accessed information at operation 410, the texture information can be stored in the extracted texture files 253.

For example, a shirt can be tessellated with triangles (e.g., about 20,000 triangles when a triangle edge is around 1 centimeter), and the vertices of the triangles can be the garment points of the three-dimensional garment model. The garment points can include location information such as an x, y, and z position value. Additionally, the location information can be independent of the color and design of the garment.

At operation 420, the access module 244 can access a 3-D body model. The three-dimensional body model can be based on body measurements of a person. For example, the body measurements can include neck size, arm length, chest size, waist size, leg length, and so on. The list of parameters is just representative, and is not intended to be exhaustive. Similarly, in some instances, the list can include a subset of the parameters listed. The 3-D body model or body measurement can be received using the communications interface 220 via the network 34.

The 3-D body model (e.g., static, animated, dynamic) may be simulated for the content stage (e.g., fashion performance, 360° view, fit map, and suggest a size). For example, the 3-D body model can be used to simulate a fashion runway experience. By using salient body parameters, the system 100 can create human-like body models to span the whole range of human bodies that can potentially wear a given garment.

At operation 430, the garment simulation module 246 can position at least a portion of the 3-D body model inside the garment points. In some instances, positioning can include placing the garment on or around the body, given that the body may be fixed in some embodiments. In these instances, the garment can be stretch and deformed based on the simulation. The garment simulation module 246 can configure at least one processor among the one or more processors (e.g., the CPU 222) to position the body model inside the garment model.

As previously mentioned, the garment model can consist of a set of shapes (e.g., triangles) to form the surface of the garment. The shapes can be created using lines connecting the vertices. Additionally the garment model can include physical properties associated with the lines (e.g., edges) and vertices in the mesh.

In some instances, simulating the garment can include placing the garment around the body at an appropriate position, and running simulations based on calculations described at operation 440. The simulation can advance the position and other related variables of the vertices of the garment based on different criteria (e.g., the laws of physics, garment material properties, body-garment interaction). The result is a large system of equations (e.g., one variable for each force component) that the garment simulation module 246 can calculate in an iterative fashion. The simulation can be completed when the simulation becomes stable. For example, the simulation can become stable when the garment reaches a steady state with a net force of zero.

At operation 440, the garment simulation module 246 can calculate one or more simulated forces acting on a subset of the garment points based on the positioning of the generated three-dimensional body model inside the garment points. The garment simulation module 246 can configure at least one processor among the one or more processors (e.g., the CPU 222) to calculate the simulated force.

The garment simulation module 246 can exploit thread and data level parallelism for space and time efficient parallelization of physical accurate garment simulation. For example, the large system of equations can be solved in parallel using the plurality of cores in a processor, and the plurality of vector execution units in a core. A single instruction multiple data (SIMD) is an example of a vector execution unit.

In some arrangements, the simulated force can include a gravitational force, an elastic force, a friction force, or an aerodynamic force. Additionally, the garment simulation module can further calculate the one or more simulated forces acting on the subset of the garment points based on the material property of the garment. For example, the simulated one or more forces can include a gravitational force and an elastic force, and the material property of the garment indicates a degree to which the garment is elastic. The material property of the garment can include, but is not limited to, a sheerness value, a linear stiffness value, or a bending stiffness value.

At operation 450, the rendering module 248 can generate an image of the three-dimensional garment model draped on the three-dimensional body model based on the calculated one or more simulated forces. The rendering module 248 can configure at least one processor among the one or more processors (e.g., the CPU 222) to generate the image at operation 460. For example, the rendering module 248 can generate an image of the tessellated 3-D garment model on a 3-D body model using the draping module 265 and the garment simulation module 246. The tessellated 3-D garment model is presented based on a simulated force. The presentation can be done by digitally draping the tessellated 3-D garment model onto a 3-D body model. In various example embodiments, operations 440 and 450 involve taking data from all previous operations, combining them, and inputting them into a cloth simulation engine for parallel computation using the plurality of cores and the plurality of vector execution units. Additionally, the simulation results from operation 440 can be stored in the simulation result geometry files 258.

At operation 460, the display module 250 can present the generated image on a display of a device. The display module 250 can configure the user interface 232 for the presentation. The display module 250 can configure at least one processor among the one or more processors (e.g., the CPU 222) to present the generated image on the display of a mobile device.

Figure 5:
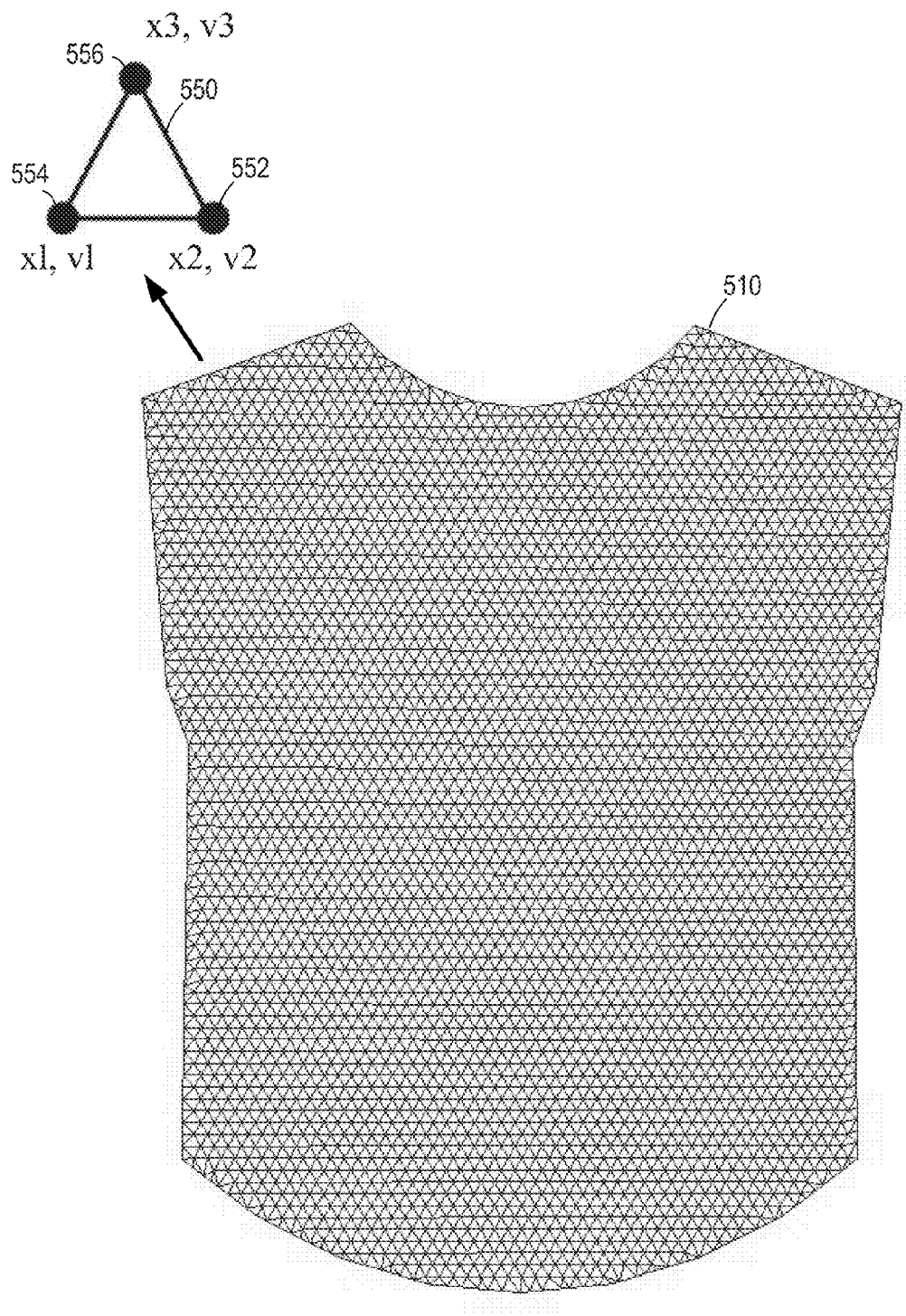
FIG. 5 illustrates a sample triangle associated with a tessellated garment, in accordance with example embodiments.

Now referring back to operation 440 of FIG. 4, the calculation of the one or more simulated forces can be implemented through specific modules (e.g., the garment simulation module 246) stored in the memory 236. Some examples of implementations and equations are described below. For example, and referring to FIG. 5, below is the system of equations to be used with operation 450 for a three-spring implementation of a sample triangle 550 with three vertices (i.e., a vertex 552, a vertex 554, and a vertex 556) associated with a tessellated garment 510, as illustrated in FIG. 5.

$$spring_{force_1} = \left(\frac{k_s}{restlength_1}\right) * (|x_2 - x_1| - restlength_1) * spring_{direction_1} + \left(\frac{k_d}{restlength_1}\right) * Dot_{Product}(v_2 - v_1, spring_{direction_1}) * spring_{direction_1}$$ (Equation 1)

$$spring_{force_2} = \left(\frac{k_s}{restlength_2}\right) * (|x_3 - x_2| - restlength_2) * spring_{direction_2} + \left(\frac{k_d}{restlength_2}\right) * Dot_{Product}(v_3 - v_2, spring_{direction_2}) * spring_{direction_2}$$ (Equation 2)

$$spring_{force_3} = \left(\frac{k_s}{restlength_3}\right) * (|x_1 - x_3| - restlength_3) * spring_{direction_3} + \left(\frac{k_d}{restlength_3}\right) * Dot_{Product}(v_1 - v_3, spring_{direction_3}) * spring_{direction_3}$$ (Equation 3)

Where $k_s$ is the elastic spring constant, $k_d$ is the damping spring constant, and each vertex has a position (x) and velocity (v).

In the equations above, when the denominator is a restlength value, a non-zero value can be used for zero-length springs. Additionally, the equations can use a visual restlength value when the denominator is not the restlength value, which in zero-length spring cases is 0. This allows for the garment simulation module 246 to handle zero-length springs without dividing by 0.

To further explain the equations above, a walkthrough of the equations is described. The state that the garment simulation module 246 can maintain is the positions and velocities of all the points that represent the garment. As the simulation moves forward in time, the garment simulation module 246 can update the positions of the points over time by computing the net force on each point at each instance in time. Then, based on the mass of the particle, the garment simulation module 246 can use the equation based on the laws of motion, F=ma, to calculate an acceleration. The acceleration determines a change in velocity, which can be used to update the velocity of each point. Likewise, the velocity determines a change in position, which can be used to update the positions. Therefore, at each point in the simulation, the garment simulation module 246 can compute the net force on each particle. The forces exerted on each particle can be based on a gravitational force, spring forces, or other forces (e.g., drag forces to achieve desired styling). The equation for gravitational force is F=mg, and the spring force is described above.

The spring force F has two components, an elastic component (e.g., the part of the equation multiplied by $k_s$) and a damping component (e.g., the part of the equation multiplied by $k_d$). The elastic component is related to the oscillation of the spring. The strength of the elastic force is proportional to the amount the spring is stretched from the restlength value, which can be determined by $x_2-x_1$ (e.g., the current length of the spring) minus the restlength value. For example, the more the spring is compressed or stretched, the higher the force pushing the spring to return to its rest state. Additionally, $k_s$ is a spring constant that allows for scaling up/down the force based on the strength of the spring, which is then multiplied by the spring direction to give the force a direction (e.g., in the direction of the spring).

The damping component calculates the damping effect (e.g., heat being generated by the spring moving, drag). Damping can be drag force, where the higher the velocity, the higher the drag/damping force. Accordingly, damping can be proportional to velocity. In the case of a spring, there can be two particles moving, so instead of a single velocity, the garment simulation module 246 computes a relative velocity between the two endpoints (e.g., $v_2-v_1$ in FIG. 5). For example, the larger the relative velocity, the faster the points are moving apart or coming close together, and as a result the larger the damping force (e.g., the damping is proportional to relative velocity). Additionally, $k_d$ is the damping spring constant to scale the damping force up/down, which can be multiplied by the spring direction to give the force a direction.

In various example embodiments, at the steady state of each simulation, the garment simulation module 246 can also compute the forces being exerted in the springs (e.g., edges) of the mesh. For example, for an edge between two vertices (e.g., $V_1$ and $V_2$), the resultant force on $V_1$ (and correspondingly $V_2$) equals:

$$F(V_1)=k(V_1,V_2)*\text{Delta}(V_1\_V_2), \text{ where} \qquad \text{(Equation 4)}$$

$k(V_1, V_2)$ is the spring constant of the spring joining $V_1$ and $V_2$ (e.g., a function of the material property of the garment); and $\text{Delta}(V_1\_V_2)$ is a velocity-dependent force function based on the change in position vectors for $V_1, V_2$ as compared to their original rest state. These forces can then be accumulated for each vertex to compute the resultant force.

Figure 15:
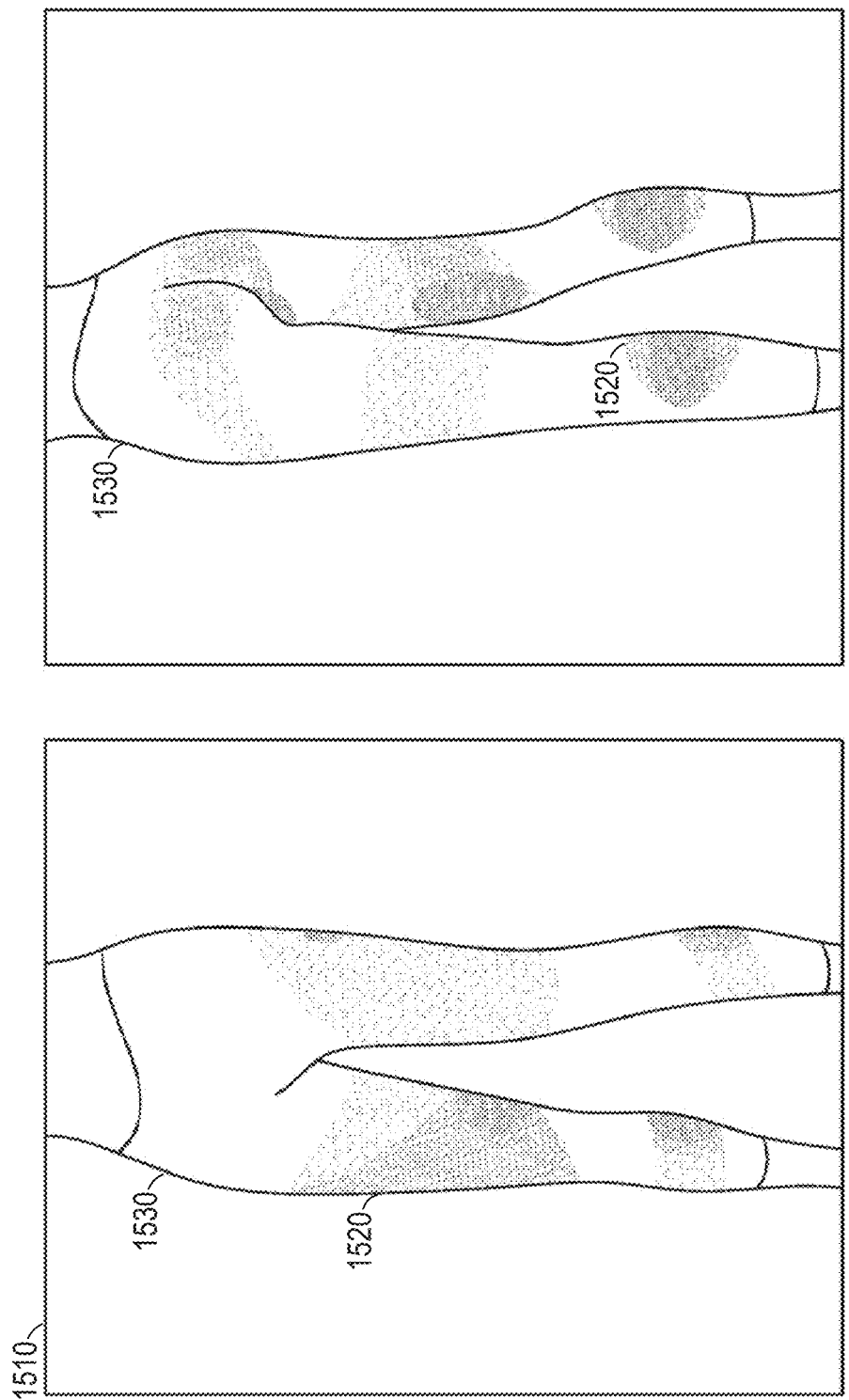
FIG. 15 illustrates an example of a fit map, in accordance with example embodiments.

In various example embodiments, for each of the bodies, the garment simulation module 246 can store the resultant force on each vertex. The resultant force on each vertex can serve as a measure of the tightness (e.g., for large force magnitude) or looseness in different regions of the garment. The resultant force computed can be interpreted as a stress, pressure, or compression on the garment. Additionally, the resultant force can be a representation of a force felt by the body at the corresponding point or region. For example, FIG. 15 shows the forces where tight regions and loose regions are depicted. For the mesh with K vertices, a total of 3K numbers can be stored.

Figure 6:
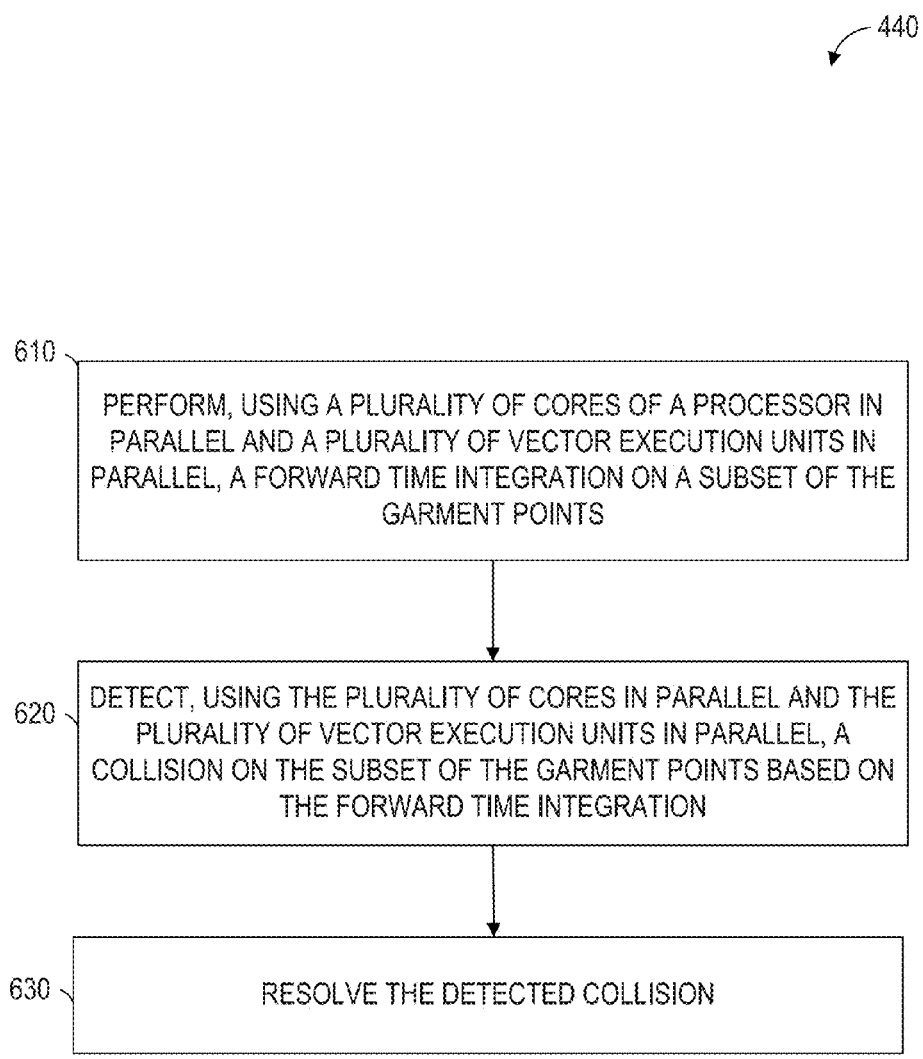
FIG. 6 illustrates a method for calculating simulated forces on garment points, in accordance with example embodiments.

FIG. 6 further describes technique for calculating the one or more simulated forces in operation 440 of FIG. 4, according to some exemplary embodiments. As previously mentioned, the collision detection module 266 and the forward time integration module 267 can take the majority of processing time (e.g., more than 99%) for a three-dimensional garment simulation. For example, the garment simulation module 246 can use the forward time integration module 267 that uses a semi-implicit integration scheme with explicit integration for position updates and implicit solvers for velocity updates. Additionally, the garment simulation module 246 can use a collision detection module 266 that has collision resolution algorithm for detecting and attempting to resolve collision of the cloth with itself or other objects in the vicinity.

At operation 610, the forward time integration module 267 can perform a forward time integration on the subset of garment points. The forward time integration can receive exerted forces on a garment point, and based on the forces, determine the position of the garment point at the next time interval. For example, the forward time integration can be based on the positioning of the body model inside the garment points at operation 430. Alternatively, the forward time integration can be based on forces exerted by another garment or by the same garment (e.g., pleated skirt). Operation 610 can be performed using a plurality of cores and a plurality of vector execution units in parallel as further described in FIG. 10.

As previously described, in order to exploit the plurality of vector execution units, the forward time integration may organize the data layout before loading the data in the vector execution units, and map the data for a vector execution. Additionally, exploiting the sparse matrix-vector multiplication (SpMV) during the forward time integration process is another technique exploiting the plurality of cores.

At operation 620, the collision detection module 266 can detect a collision on the subset of garment points based on the forward time integration at operation 610. Additionally, at operation 630, the collision detection module 266 can resolve the detected collision. Operations 620 and 630 can be performed using a plurality of cores and a plurality of vector execution units in parallel as further described in FIG. 7.

Figure 7:
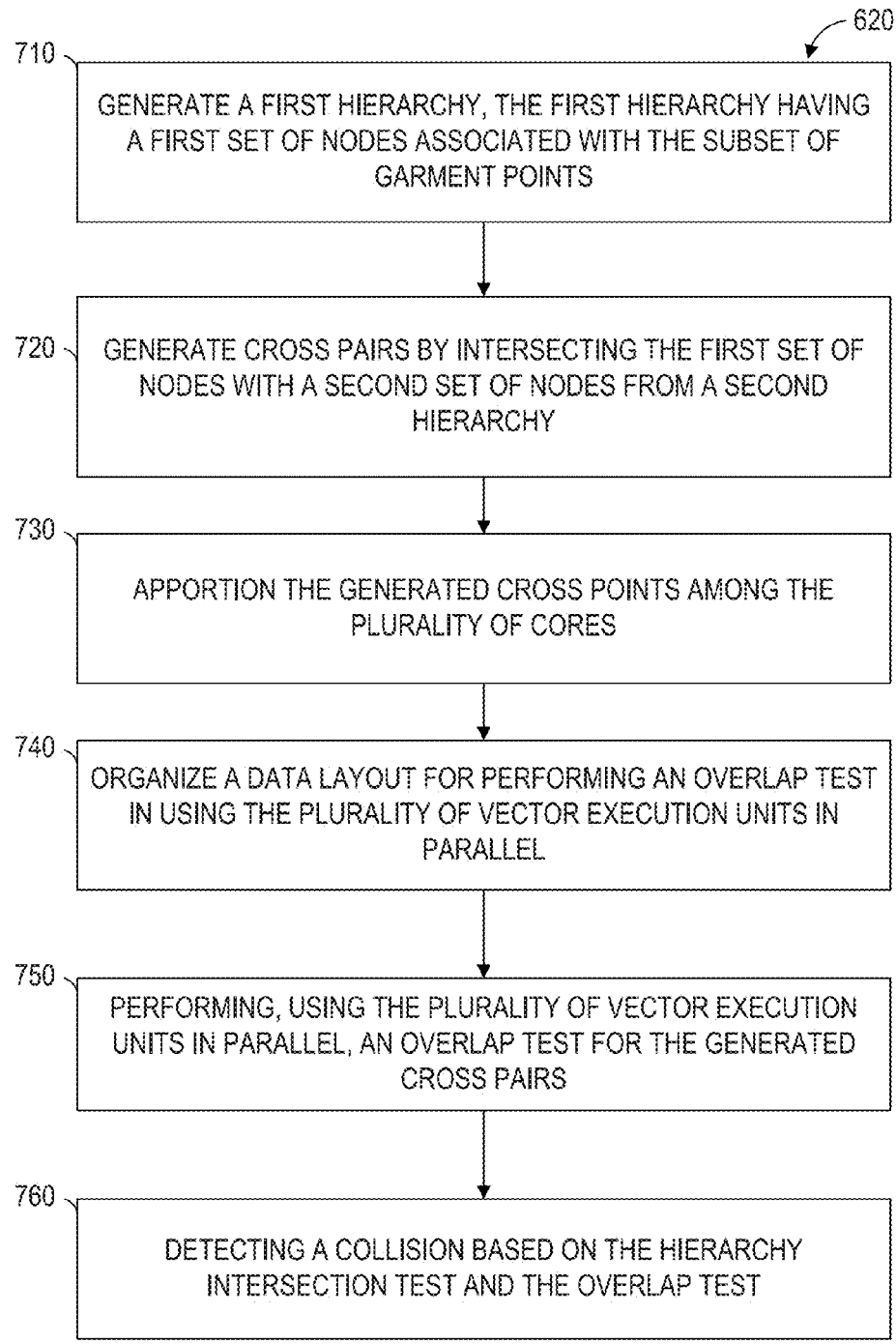
FIG. 7 illustrates a method for collision detection, in accordance with example embodiments.

FIG. 7 illustrates a technique for a detecting a collision using a plurality of cores and plurality of vector execution units in parallel, according to some exemplary embodiments. FIG. 7 describes operation 620 in more details.

In the collision detection module 266, in order to exploit the plurality of cores, the garment simulation can build a tree-based hierarchical acceleration data structures (e.g., hierarchical tree structures). The collision queries involve computing the intersection of the hierarchical tree structures and outputting a list of potentially colliding nodes of the tree. For example, building a hierarchical tree structure may help reduce the collision time to average of O(N log N), as opposed to an O(N*N) naive implementation.

In various embodiments, for a given garment, the collision detection module 266 can build a few hierarchies (e.g., for the vertices of the garment (Vertex-Hierarchy), edges of the garment (Edge-Hierarchy), and triangles of the garment (Triangle-Hierarchy)). These hierarchies can then be intersected with each other (e.g., Vertex-Vertex, Vertex-Edge), and the resultant pair of intersecting nodes reported as output.

At operation 710, the collision detection module 266 can generate a first hierarchy. The first hierarchy can have a first set of nodes associated with the subset of garment points described in operation 440.

At operation 720, the collision detection module 266 can generate cross pairs by intersecting the first set of nodes with a second set of nodes from a second hierarchy.

Figure 8:
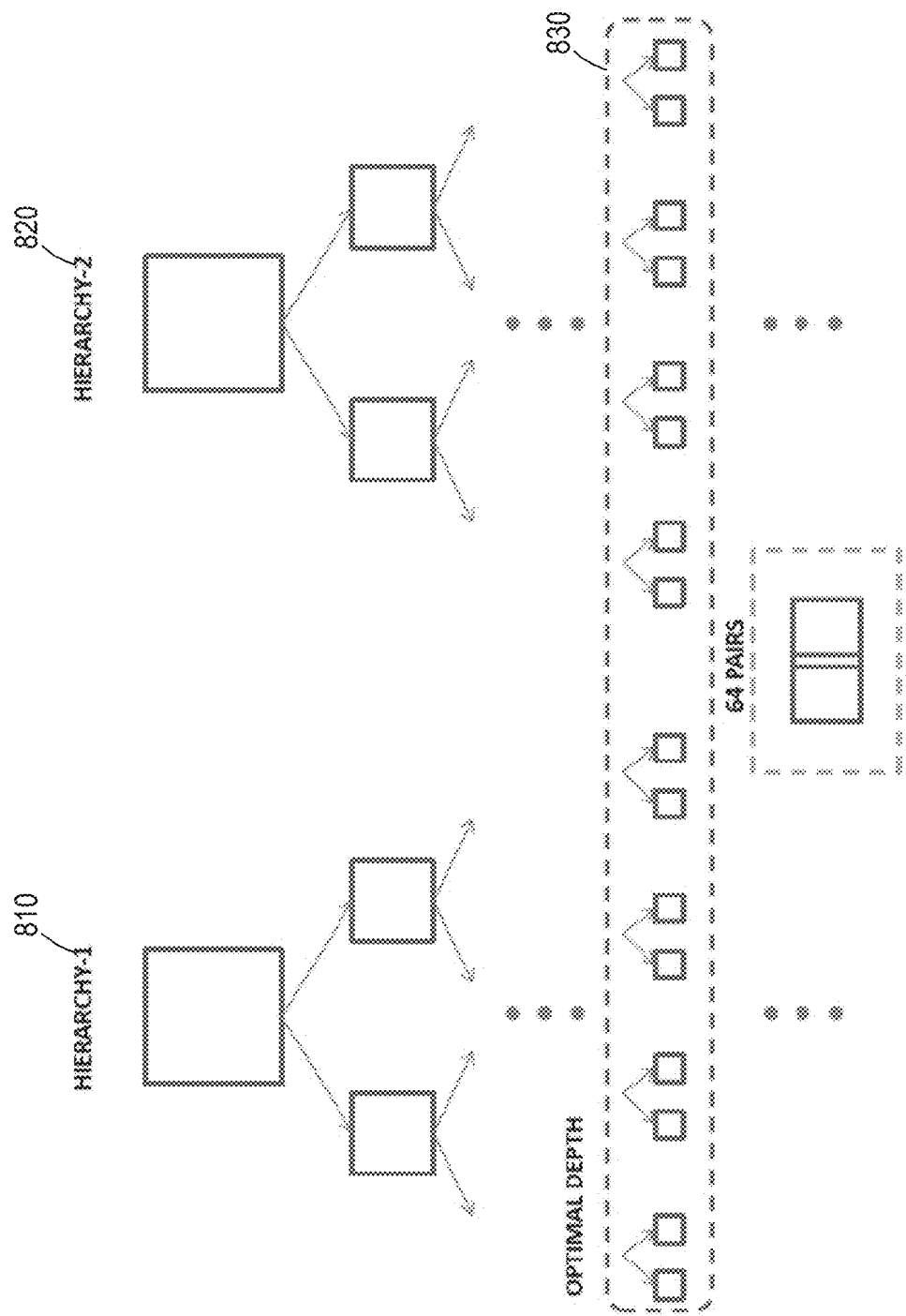
FIG. 8 illustrates an example of a hierarchy tree of utilizing plurality of cores and plurality of vector units on each core, in accordance with example embodiments.

For example, FIG. 8 illustrates a first hierarchy 810 and a second hierarchy 820. The collision detection module 266 can generate cross pairs by traversing down to a depth of three in the first hierarchy 810 and the second hierarchy 820. As illustrated, both hierarchies are binary trees (i.e., each node has two children), and each hierarchy has eight nodes at a depth of three. Accordingly, by combining the eight nodes from the first hierarchy 810 and the eight nodes from the second hierarchy 820, the collision detection module 266 can generate 64 cross pairs 830.

To exploit the plurality of cores, while performing a hierarchy intersection, the 64 cross pairs 830 are distributed amongst the C cores, where C is the number of cores in the processor. As a result, each core can perform collision detection on approximately 64/C pairs.

According to another example, a test execution system may traverse down to a depth of 5, which results in 32 nodes for each hierarchy of a binary tree. By combining the 32 nodes from each hierarchy, 1,024 cross pairs can be generated. Additionally, as the value of C increases, the collision detection module 266 can increase the number of potentially colliding pairs, so that each core has between 50-100 pairs to intersect in this example. In practice, techniques for exploiting the plurality of cores while performing hierarchy intersection can achieve near-linear speedups on the test execution systems. For example, the text execution systems can achieve around 15.9 X thread-level scaling on a 16-core test system.

Referring back to FIG. 7, at operation 730, the collision detection module 266 can apportion (e.g., divide and allocate) the generated cross points among the plurality of cores of a processor. In some instances, a first subgroup of cross pairs from the generated cross pairs can be allocated to a first core from the plurality of cores. As previously described, a processor can have a plurality cores, and each core can have a plurality of vector execution units (e.g., SIMD).

At operation 740, the collision detection module 266 can organize a data layout in order for an overlap test to be performed using the plurality of vector execution units in parallel. In some instances, data layout reorganization can be utilized to exploit the plurality of SIMD registers while performing hierarchy intersection. For example, the X-coordinates of the S nodes may not be laid out consecutively. Thus, the collision detection module 266 can organize the data layout in support of hardware gather instructions to prevent potentially lowering the speedups achieved. For processors without hardware support for gathering instructions, the collision detection module 266 can gather instructions to load data from non-consecutive memory locations into a vector register.

An example of the data layout reorganization can include the collision detection module 266 loading S vector registers (assuming S>6), each with [Min_$N_1$_X, Max_$N_1$_X, Min_$N_2$_Y, Max_$N_2$_Y, Min_$N_1$_Z and Max_$N_2$_Z]. In the case that S<6, the loading can be divided into separate S vector registers. Subsequently, the collision detection module 266 can perform the transpose of these vectors using standard instructions, so that the first register has [Min_$N_1$_$X_1$, Min_$N_1$_$X_2$, . . . , Min_$N_1$_$X_S$], and so on.

For example, instruction can be used to transposes four registers (e.g., A, B, C, and D). For illustration purposes, before the transpose, the four registers can be:

A=[a, b, c, d]
B=[e, f, g, h]
C=[i, j, k, l]
D=[m, n, o, p].

Subsequently, after the transpose, the four registers can now be:

A=[a, e, i, m]
B=[b, f, j, n]
C=[c, g, k, o]
D=[d, h, l, p].

At operation 750, the collision detection module 266 can perform, using the plurality of vector execution units in parallel, an overlap test for the generated cross pairs. The collision detection module 266 can determine whether boundaries of cross pairs are overlapping based on the one or more exerted forces on the garment points.

In some instances, operation 750 can be performed using the plurality of vector execution units in parallel with the organized data layout from operation 740. Alternatively, in some instances (e.g., a processor with hardware support for gather instructions), the collision detection module 266 can perform operation 750 after apportioning the generated cross points at operation 730.

The collision detection module 266 can perform the overlap tests between various pairs of nodes starting from a root node. In contrast, typical serial implementations for intersection tests between nodes $N_1$ and $N_2$ involve comparing the boundary extents of the nodes, and declaring them as intersecting if for any of the dimensions the extents overlap.

For example, Min_$N_1$_X and Max_$N_1$_X can represent the extent of $N_1$ in the X direction. Similarly, Min_$N_2$_X and Max_$N_2$_X can represent the extent of $N_2$ in the X direction. Similar expressions for Y and Z directions are described in equations. Accordingly, $N_1$ and $N_2$ do not overlap if:

$$\text{Min\_}N_1\text{\_}X > \text{Max\_}N_2\text{\_}X \text{ OR} \quad \text{(Equation 5)}$$

$$\text{Min\_}N_2\text{\_}X > \text{Max\_}N_1\text{\_}X \text{ OR} \quad \text{(Equation 6)}$$

$$\text{Min\_}N_1\text{\_}Y > \text{Max\_}N_2\text{\_}Y \text{ OR} \quad \text{(Equation 7)}$$

$$\text{Min\_}N_2\text{\_}Y > \text{Max\_}N_1\text{\_}Y \text{ OR} \quad \text{(Equation 8)}$$

$$\text{Min\_}N_1\text{\_}Z > \text{Max\_}N_2\text{\_}Z \text{ OR} \quad \text{(Equation 9)}$$

$$\text{Min\_}N_2\text{\_}Z > \text{Max\_}N_1\text{\_}Z \quad \text{(Equation 10)}.$$

Thus, in the example, $N_1$ and $N_2$ overlap if none of the above inequalities are satisfied.

Additionally, to perform the overlap test by using the SIMD in parallel, the collision detection module 266 these overlap tests on S simultaneous nodes, where S can equal the number of vector execution units (e.g., SIMD registers). For example, $N_1$_1, $N_1$_2 . . . $N_1$_S can represent the S nodes from the first hierarchy that we are going to compare the extents of with $N_2$_1, $N_2$_2 . . . $N_2$_S from the second hierarchy. The corresponding inequalities become:

$$\text{Min\_}N_1\text{\_}X[1 \ldots S] > \text{Max\_}N2\text{\_}X[1 \ldots S] \text{ OR} \quad \text{(Equation 11)}$$

$$\text{Min\_}N2\text{\_}X[1 \ldots S] > \text{Max\_}N1\text{\_}X[1 \ldots S] \text{ OR} \quad \text{(Equation 12)}$$

$$\text{Min\_}N1\text{\_}Y[1 \ldots S] > \text{Max\_}N2\text{\_}Y[1 \ldots S] \text{ OR} \quad \text{(Equation 13)}$$

$$\text{Min\_}N2\text{\_}Y[1 \ldots S] > \text{Max\_}N1\text{\_}Y[1 \ldots S] \text{ OR} \quad \text{(Equation 14)}$$

$$\text{Min\_}N1\text{\_}Z[1 \ldots S] > \text{Max\_}N2\text{\_}Z[1 \ldots S] \text{ OR} \quad \text{(Equation 15)}$$

$$\text{Min\_}N2\text{\_}Z[1 \ldots S] > \text{Max\_}N1\text{\_}Z[1 \ldots S] \quad \text{(Equation 16)}$$

In the above example, each of these inequalities (e.g., Equation 11) can be performed as a single vector instruction by loading the Min_$N_1$_X of the S nodes using a vector load instruction, followed by loading Max_$N_2$_X of the S nodes using a vector load instruction, followed by a vector comparison (e.g., greater than) instruction. Hence, using the techniques described herein, the collision detection module 266 can theoretically achieve a speedup of S.

At operation 760, the collision detection module 266 can detect a collision based on the hierarchy intersection test and the overlap test. For example, a collision can be detected when the boundaries of the cross pairs are overlapping based on the determination in operation 740.

Figure 9:
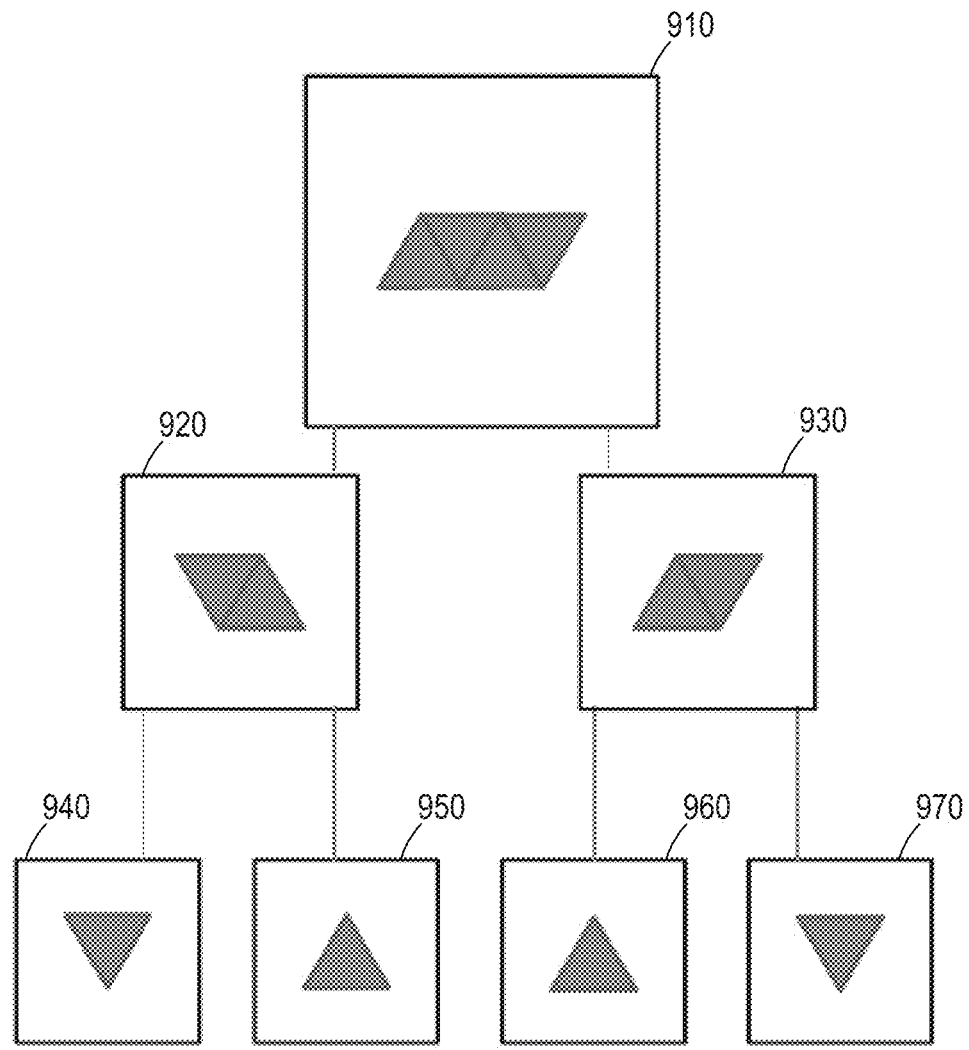
FIG. 9 illustrates another example of a hierarchy tree, in accordance with example embodiments.

FIG. 9 illustrates another hierarchy tree example using triangles in a garment mesh. In this example, the root node 910 is broken down into two children at the first depth, represented by node 920 and node 930. At the second depth, node 920 is broken down into node 940 and node 950. Additionally, at the second depth, node 930 is broken down into node 960 and node 970. The hierarchy tree can speed up the process for the overlap test because the overlap test may not be need to be perform for children nodes, when it is determined that the parent node is not overlapping.

Figure 10:
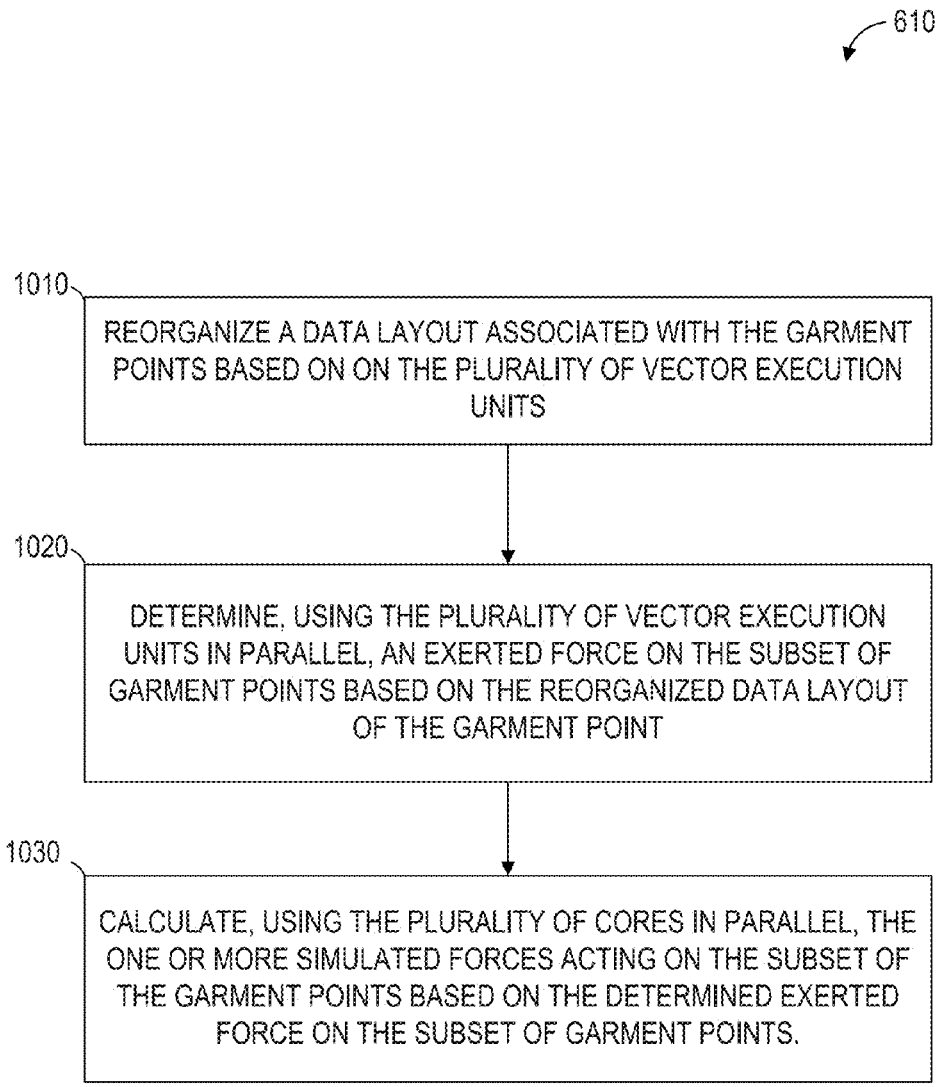
FIG. 10 illustrates a method for forward time integration in accordance with example embodiments.

FIG. 10 illustrates a technique for a performing a forward time integration on a subset of the garment points, according to some exemplary embodiments. FIG. 10 further describes operation 610 in more details.

In some instances, a majority of the run-time for Advance Time (AT) is spent in a conjugate gradient solver. The conjugate gradient solver includes updating the force (e.g., velocity) of each garment point (e.g., vertex) based on the force of each of its neighboring garment points. For example, say a vertex $V_1$, has three neighboring vertices, $V_2$, $V_3$ and $V_4$ respectively. Then, the following equations can be evaluated for the conjugate gradient solver: $F(V_1)+=k^*\text{Vel}(V_1)-\text{Vel}(V_2)$, and $F(V_2)-=k^*\text{Vel}(V_1)-\text{Vel}(V_2)$. Similar expressions can be evaluated for $V_3$ and $V_4$.

In current implementations, scalar implementations proceed as follows: For all pairs of edges, the above expression is evaluated, and the three updated. In contrast, the technique described in FIG. 10 allows for a parallel implementation for evaluating the above expression and updating the force exerted on a garment point.

For example, in order to exploit SIMD, the forward time integration module 267 performs the above computation on S simultaneous pairs of edges. S can correspond to the number of the vector execution units (e.g., SIMD registers) in a core of a processor. Additionally, the S edges in the mesh can be denoted by $(L_1, R_1), (L_2, R_2), \ldots, (L_S, R_S)$. In order to perform the above equation, the forward time integration module 267 can load the velocity corresponding to $L_1 \ldots L_S$ in 3 SIMD registers, which denote the X, Y and Z components of the velocity. Furthermore, the forward time integration module 267 can load the velocity associated with $R_1 \ldots R_S$ into 3 SIMD registers.

Returning back to FIG. 10, operations 1010, 1020, and 1030 can be implemented for exploiting the SIMD registers to evaluate the equations in parallel for the conjugate gradient solver.

At operation 1010, the forward time integration module 267 can organize a data layout associated with the garment points (e.g., forces exerted on the garment points) based on the plurality of vector execution units (e.g., SIMD). Operation 1010 is further described in the flowchart illustrated by FIG. 11.

At operation 1020, the forward time integration module 267 can determine, using the plurality of vector execution units in parallel, an exerted force on the subset of garment points based on the organized data layout of the garment points. The plurality of vector execution units can be used in parallel partly because the data layout has been organized for efficient parallelization.

At operation 1030, the forward time integration module 267 can calculate, using a plurality of cores in parallel, the one or more simulated forces acting on the garment points based on the determination at operation 1020. For example, the calculated one or more simulated forces can be used by operation 450 (FIG. 4) to generate an image of the 3-D garment model draped on the 3-D body model.

Figure 11:
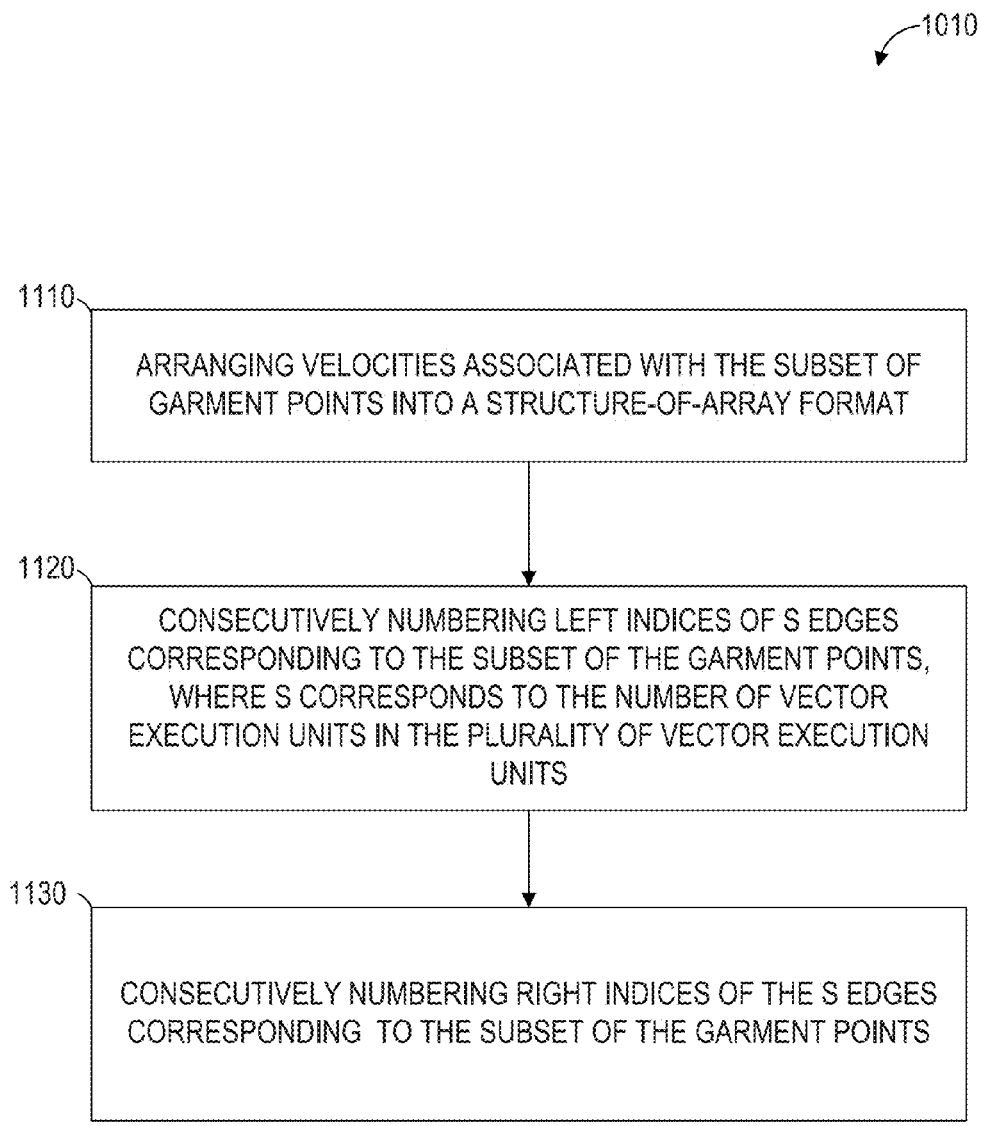
FIG. 11 illustrates a method for reorganizing a data layout associated with the garment points, in accordance with example embodiments.

FIG. 11 is a flow chart that further describes the reorganization of the data layout from operation 1010 in more details.

Figure 12:
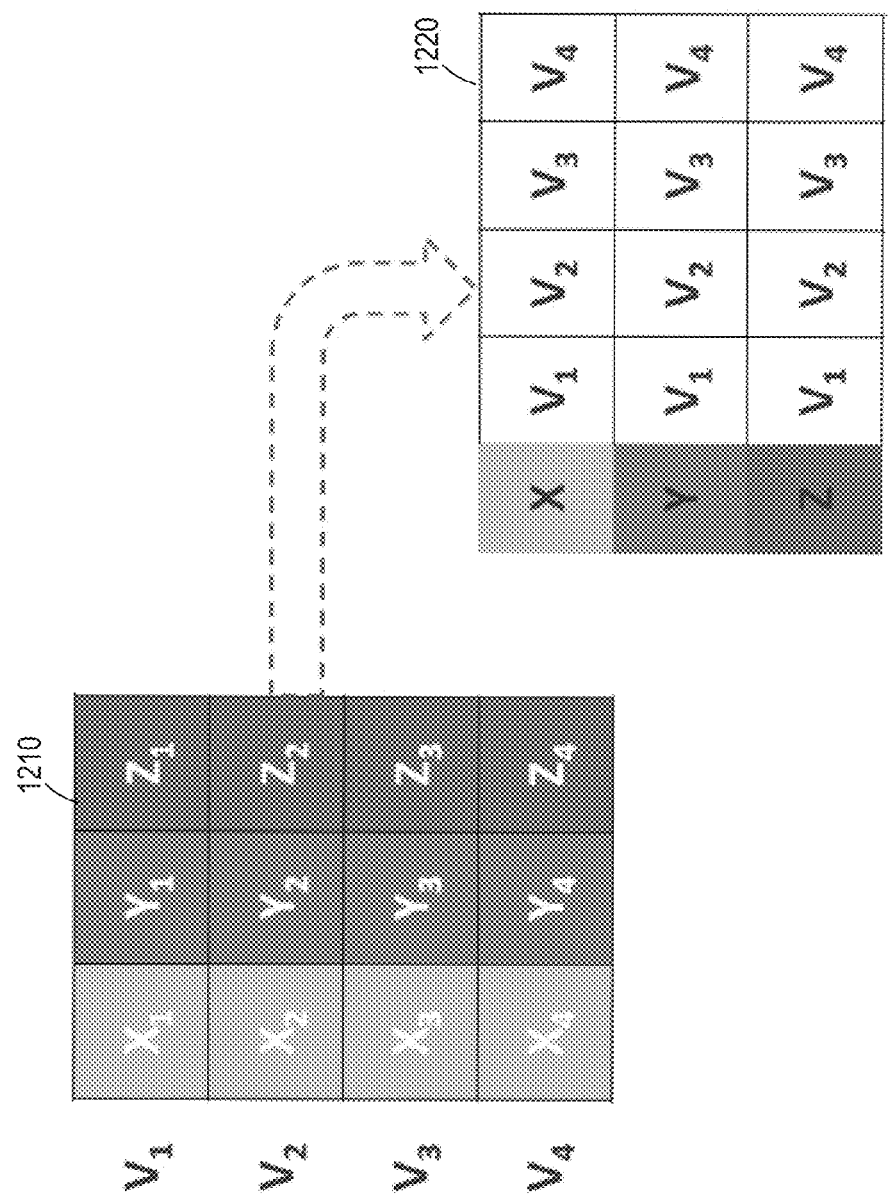
FIG. 12 illustrates an example of a conversion from an Array-of-Structure (AOS) format to a structure-of-array (SOA) format, in accordance with example embodiments.

At operation 1110, the forward time integration module 267 can arrange the forces (e.g., velocities) associated with the subset of garment points into a structure-of-array (SOA) format. FIG. 12 illustrates an example of the reorganization of the data layout associated with forces (e.g., velocities) exerted on a garment point into a SOA format.

FIG. 12 illustrates the velocity of the vertices arranged in an Array-of-Structure (AOS) format 1210 being re-arranged in a SOA format 1220. In the AOS format 1210, attributes of each vertex (e.g., X, Y, and Z) are laid out consecutively. Alternatively, in the SOA format 1220, the X attributes of all vertices are laid out consecutively, followed by the Y attributes, Z attributes, and so on. For example, in the SOA format 1220, the first row can include $V_1, V_2, V_3 \ldots,$ and $V_M$ for the X component of the velocity, where M (not illustrated in FIG. 12) is the number of vertices. The second row can include $V_1, V_2, V_3 \ldots,$ and $V_M$ for the Y component of the velocity. The third row can include $V_1, V_2, V_3, \ldots,$ and $V_M$ for the Z component of the velocity. SOA format 1220 makes it easier for the SIMD registers to calculate the forces in parallel.

At operation 1120, the forward time integration module 267 can consecutively number left indices of a specific quantity of edges corresponding to the subset of the garment points. The specific quantity of edges corresponds to the number of vector execution units in the plurality of execution units.

At operation 1130, the forward time integration module 267 can consecutively number right indices of the specific quantity of edges corresponding to the subset of the garment points.

Figure 13:
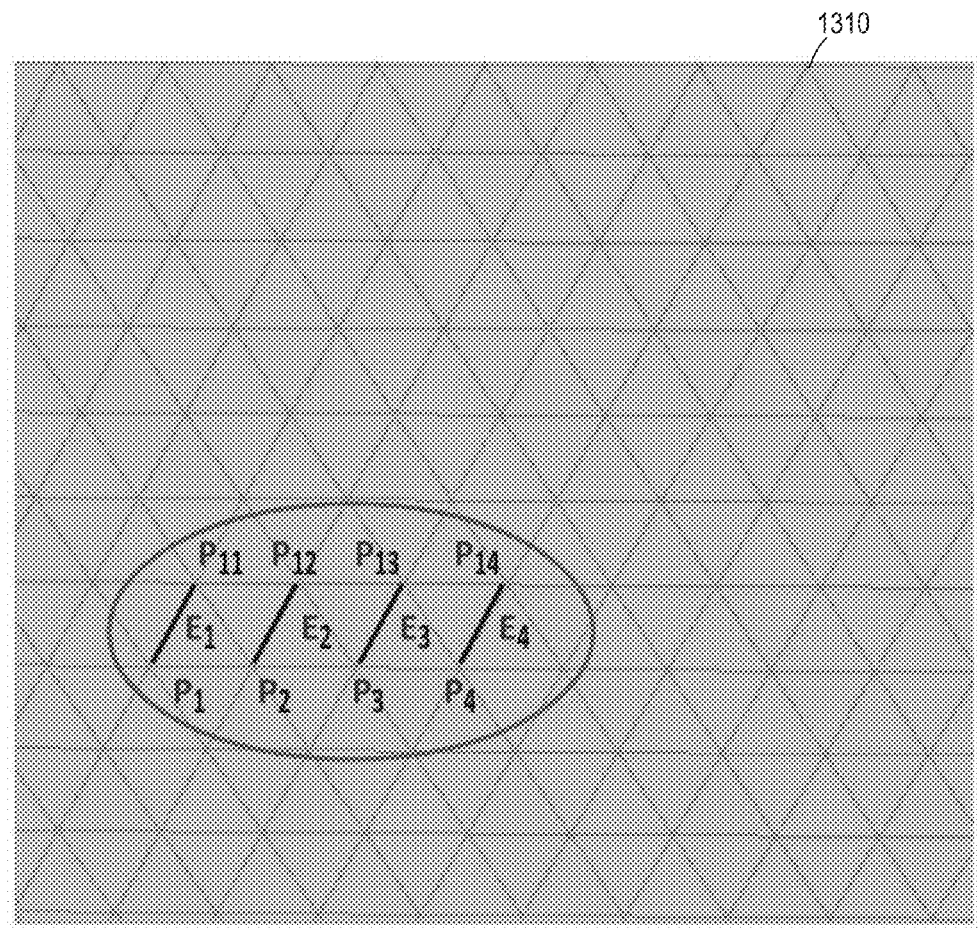
FIG. 13 illustrates an example of a garment mesh with consecutively numbered edges, in accordance with example embodiments.

FIG. 13 illustrates a tessellated mesh 1310, and four pairs of edges ($E_1, E_2, E_3,$ and $E_4$). The left and right end points for each edge can be formed from consecutively numbered vertices. FIG. 13 further illustrates a garment mesh with the consecutive numbering of the edges in accordance to operations 1120 and 1130. At operation 1120, the consecutively numbered left indices in FIG. 13 can be $P_1, P_2, P_3,$ and $P_4$, corresponding to edges $E_1, E_2, E_3,$ and $E_4$ respectively. At operation 1130, the consecutively numbered right indices in FIG. 13 can be $P_{11}, P_{12}, P_{13},$ and $P_{14}$, corresponding to edges $E_1, E_2, E_3,$ and $E_4$ respectively.

To summarize, in the example illustrated by FIGS. 10-13, the forward time integration module 267 can perform the forward time integration in parallel by organizing out the garment point data in the SOA format (e.g., SOA format 1220), and loading the data in the SIMD registers in the SOA format. Additionally, the forward time integration module 267 can re-order the indices of the mesh as a pre-process before executing the simulation algorithm. The re-ordering of the indices can allow for a large number of edges equal to the number of registers in the SIMD) to be formed and calculated in parallel. Using empirical data, for a regular tessellated garment mesh, the forward time integration module 267 may be able to cluster 80% to 85% of the edges into groups for parallel processing.

In some instances, the SIMD algorithm described herein for the forward time integration can achieve S/2 to 2S/3 speedup, where S is the number of SIMD registers. For example, on a test system with S=8, we achieved a scaling of around 5×.

Figure 14:
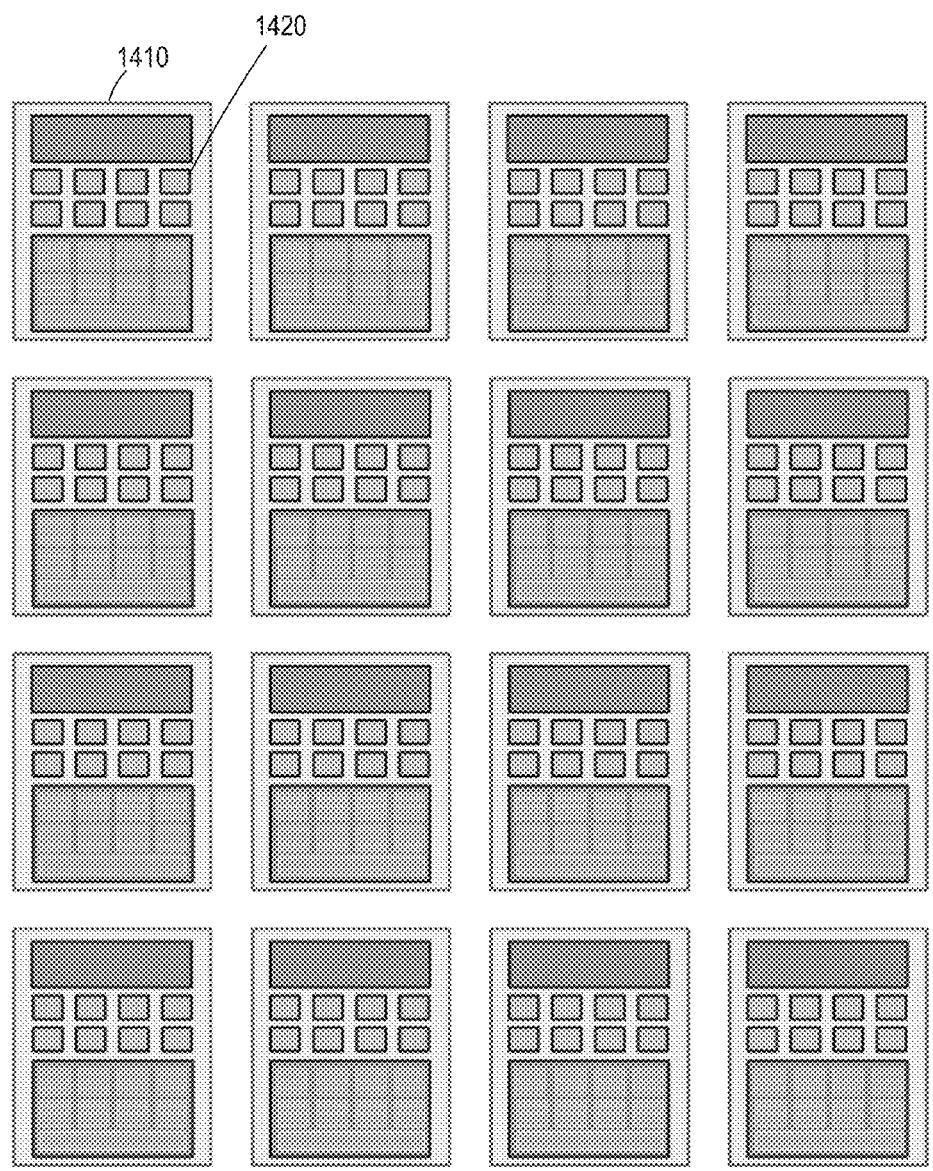
FIG. 14 illustrates a diagram of a modern multi-core SIMD-enabled CPU architecture, in accordance with example embodiments.

FIG. 14 illustrates a diagram of a modern multi-core SIMD-enabled CPU architecture, in accordance with example embodiments. In this example, there are 16 cores (e.g., core 1410). Additionally, each core (e.g., core 1410) has eight vector execution units (e.g., SIMD 1420). Accordingly, the SIMD 1420 has a width of eight.

Furthermore, techniques for displaying a fit map on a garment based on the calculated forces on the garment points are provided, in accordance with example embodiments. As previously mentioned, the forces calculated at operation 440 can be calculated using the plurality of cores and the plurality of vector execution units. The fit map can illustrate tension forces, inferred force, or pressure on the body. The fit map can show and convey regions of the garment that can be tight or loose on a user. This additional information can aid the user in making an informed purchase decision without physically trying on the garment.

As illustrated by FIG. 15, the garment model can be draped on the body model. According to some example embodiments, the method 400 can further include operations where the garment simulation module 246 is configured to generate a fit map based on the calculated simulated forces, and the display module 250 can present the generated image at operation 460 with a generated fit map 1510 as illustrated in FIG. 15.

The fit map can show display cues. For example, a set of output forces can be chosen. Each output force can correspond to a range of forces (e.g., tight, loose) that can be displayed to the user. FIG. 15 shows an example of a fit map 1510 with color display cues. As illustrated in FIG. 15, the display cues can be overlaid on the rendered garment itself. As illustrated, the generated fit map 1510 can be based on a magnitude of the calculated simulated forces. For example, when the magnitude of the calculated simulated forces is high, the fit map 1510 can label that section of the garment as a tight section 1520. Alternatively, a loose section 1530 occurs when the magnitude of the calculated simulated forces is low.

FIG. 16 illustrates how a garment looks and feels by demonstrating a lifestyle presentation using the method 400, according to some example embodiments. The body model described in the method 400 can have a first body position 1610, and the garment simulation module 246 is further configured to change the three-dimensional body model to a second body position 1620. By animating the body model (e.g., a user swinging a golf club, a model walking down a runway), the method 400 can be configured to generate a three-dimensional digital media content simulation. In some instances, changing the body positions of the body model can present an animation the body model. After the body model is changed to the second body position 1620, the garment simulation module 246 can reposition at least a portion of the three-dimensional body model inside the garment points based on the change of the three-dimensional body model to the second body position 1620. Furthermore, after the repositioning, the garment simulation module 246 can calculate the simulated forces acting on a second subset of the garment points based on the repositioning.

Additionally, the rendering module 248 is further configured to animate the generated image as the three-dimensional body model moves from the first body position 1610 to the second body position 1620, and subsequently to a third body position 1630, which can be presented using the display module 250.

The garment simulation module 246 can animate each of the body meshes under different animation sequences, such as swinging a golf club, as illustrated in FIG. 16. In some instances, the garment simulation module 246 can animate the body meshes to perform a fashion presentation by superimposing motion-captured data (e.g., of different points on a body mesh) on the given mesh. Any kind of motion can be superimposed to form a catalogue of motions that a user can eventually choose from.

In various example embodiments, for each of the above animation frames, the garment simulation module 246 can perform the stable garment simulation to compute the vertex positions of the garment using the plurality of cores and the plurality of vector executions units in parallel. The garment positions can then be stored. Likewise, the forces can be computed and stored. The garment simulation module 246 can exploit spatial coherence within consecutive frames to speed up the simulation run-time, for example by using the stable position of the previous frame as the starting position for the current frame and computing the resultant motion parameters of the garment.

Moreover, the precision can be adjusted to accommodate varying levels of desired accuracy of the garment model and can be based on computation power. The precision can be automatically adjusted by the system 100 based on the client device (e.g., lower precision for a mobile device, higher precision for a large screen display). In some instances, the standard error of tolerance is a parameter that can be set. Tolerance can be measured by actual units of distance (e.g., 0.01 inches). Alternatively, tolerance can be measured in numbers of pixels.

Figure 17:
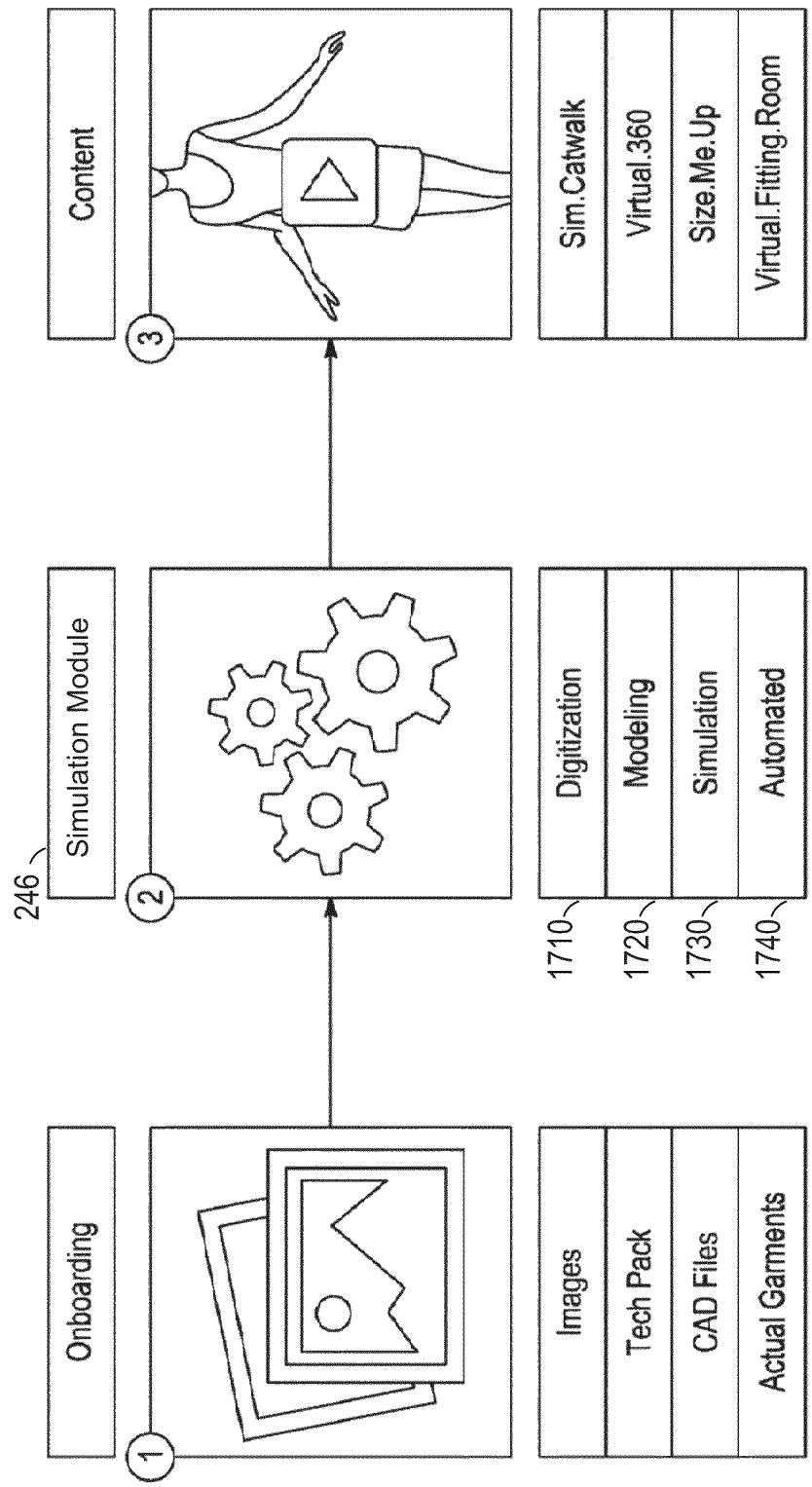
FIG. 17 is a block diagram illustrating an example digital content media simulation, in accordance with example embodiments.

As illustrated in FIG. 17, the garment simulation module 246 can take as input tessellation and material properties and can output 3-D models of clothing on avatars. The garment simulation module 246 can use digitization 1710, modeling 1720, simulation 1730, and automated 1740 techniques to generate a three-dimensional simulation. The garment simulation module 246 can move points around to fit a 3-D body model based on a simulated force (e.g., friction, stitching force). Additionally, based on this modeling, the points are connected via springs and can be stretched based on a simulated force (e.g., gravity, material property of garment). The garment simulation module 246 can solve a system of equations in parallel (e.g., using a plurality of cores, using a plurality of vector execution units), given that the equations are all inter-connected. In one example, the system of equations can be based on the spring force on each vertex.

Moreover, one or more of the methodologies described herein may facilitate the smooth simulation and visualization of a garment on a 3-D body model using the garment simulation module 246.

When these effects are considered in aggregate, one or more of the methodologies described herein may obviate a need for certain efforts or resources that otherwise would be involved in digitizing the garment from images. Efforts expended by a user in generating 3-D models may be reduced by one or more of the methodologies described herein. Computing resources used by one or more machines, databases, or devices (e.g., within the system 100) may similarly be reduced. Examples of such computing resources include processor cycles, network traffic, memory usage, data storage capacity, power consumption, and cooling capacity.

Figure 18:
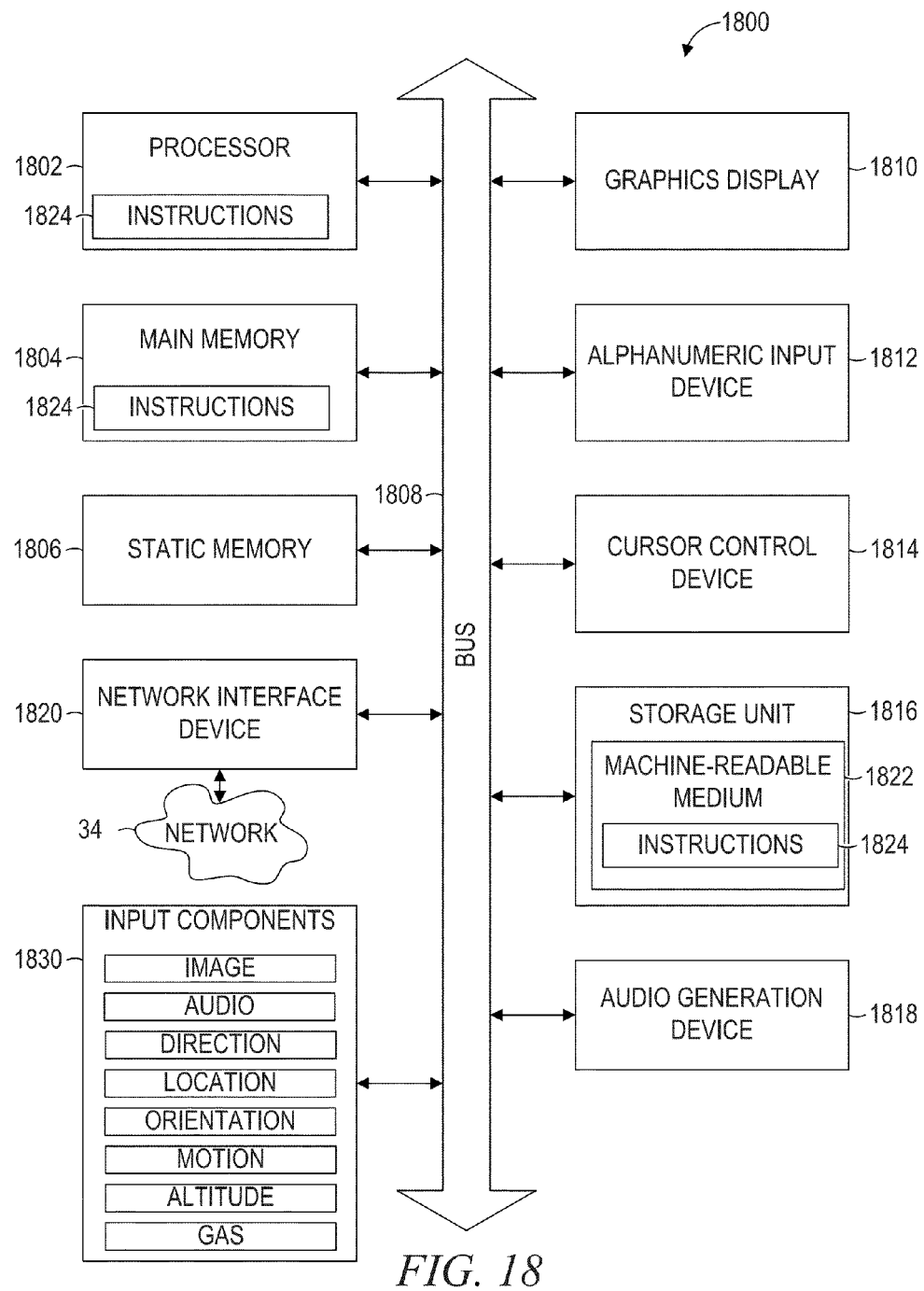
FIG. 18 is a block diagram illustrating components of a machine, according to some example embodiments, able to read instructions from a machine-readable medium and perform any one or more of the methodologies discussed herein.

FIG. 18 is a block diagram illustrating components of a machine 1800, according to some example embodiments, able to read instructions 1824 from a machine-readable medium 1822 (e.g., a non-transitory machine-readable medium, a machine-readable storage medium, a computer-readable storage medium, or any suitable combination thereof) and perform any one or more of the methodologies discussed herein, in whole or in part. Specifically, FIG. 18 shows the machine 1800 in the example form of a computer system (e.g., a computer) within which the instructions 1824 (e.g., software, a program, an application, an applet, an app, or other executable code) for causing the machine 1800 to perform any one or more of the methodologies discussed herein may be executed, in whole or in part. The server 202 can be an example of the machine 1800.

In alternative embodiments, the machine 1800 operates as a standalone device or may be connected (e.g., networked) to other machines. In a networked deployment, the machine 1800 may operate in the capacity of a server machine or a client machine in a server-client network environment, or as a peer machine in a distributed (e.g., peer-to-peer) network environment. The machine 1800 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1824, sequentially or otherwise, that specify actions to be taken by that machine. Further, while only a single machine is illustrated, the term "machine" shall also be taken to include any collection of machines that individually or jointly execute the instructions 1824 to perform all or part of any one or more of the methodologies discussed herein.

The machine 1800 includes a processor 1802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1804, and a static memory 1806, which are configured to communicate with each other via a bus 1808. The processor 1802 may contain microcircuits that are configurable, temporarily or permanently, by some or all of the instructions 1824 such that the processor 1802 is configurable to perform any one or more of the methodologies described herein, in whole or in part. For example, a set of one or more microcircuits of the processor 1802 may be configurable to execute one or more modules (e.g., software modules) described herein.

The machine 1800 may further include a graphics display 1810 (e.g., a plasma display panel (PDP), a light emitting diode (LED) display, a liquid crystal display (LCD), a projector, a cathode ray tube (CRT), or any other display capable of displaying graphics or video). The machine 1800 may also include an alphanumeric input device 1812 (e.g., a keyboard or keypad), a cursor control device 1814 (e.g., a mouse, a touchpad, a trackball, a joystick, a motion sensor, an eye tracking device, or other pointing instrument), a storage unit 1816, an audio generation device 1818 (e.g., a sound card, an amplifier, a speaker, a headphone jack, or any suitable combination thereof), and a network interface device 1820.

The storage unit 1816 includes the machine-readable medium 1822 (e.g., a tangible and non-transitory machine-readable storage medium) on which are stored the instructions 1824 embodying any one or more of the methodologies or functions described herein. The instructions 1824 may also reside, completely or at least partially, within the main memory 1804, within the processor 1802 (e.g., within the processor's cache memory), or both, before or during execution thereof by the machine 1800. Accordingly, the main memory 1804 and the processor 1802 may be considered machine-readable media (e.g., tangible and non-transitory machine-readable media). The instructions 1824 may be transmitted or received over the network 34 via the network interface device 1820. For example, the network interface device 1820 may communicate the instructions 1824 using any one or more transfer protocols (e.g., hypertext transfer protocol (HTTP)).

The machine-readable medium 1822 may include a magnetic or optical disk storage device, solid state storage devices such as flash memory, or other non-volatile memory device or devices. The computer-readable instructions 1824 stored on the machine-readable medium 1822 are in source code, assembly language code, object code, or another instruction format that is interpreted by one or more processors (e.g., processor 1802).

In some example embodiments, the machine 1800 may be a portable computing device, such as a smartphone or tablet computer, and have one or more additional input components 1830 (e.g., sensors or gauges). Examples of such input components 1830 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components 1830 may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1822 is shown in an example embodiment to be a single medium, the term "machine-readable medium" should be taken to include a single medium or multiple media (e.g., a centralized or distributed database, or associated caches and servers) able to store the instructions 1824. The term "machine-readable medium" shall also be taken to include any medium, or combination of multiple media, that is capable of storing the instructions 1824 for execution by the machine 1800, such that the instructions 1824, when executed by one or more processors of the machine 1800 (e.g., the processor 1802), cause the machine 1800 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

The foregoing description, for purposes of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the present disclosure and its practical applications, to thereby enable others skilled in the art to best utilize the present disclosure and various embodiments with various modifications as are suited to the particular use contemplated.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system comprising:
memory configured to access, from a database, a first three-dimensional garment model of a garment, the first three-dimensional garment model including garment points that represent a surface of the garment; and
a processor having a plurality of cores and configured by a garment simulation module to:
generate cross pairs, a cross pair among the cross pairs being generated by combining a garment point from the garment points with a second point from a second three-dimensional model;
apportion the generated cross pairs among the plurality of cores, a first subgroup of cross pairs from the generated cross pairs being allocated to a first core from the plurality of cores, the first core having a quantity of vector execution units;

organize a data layout of one or more exerted forces being exerted on a subset of the garment points based on the quantity of vector execution units, the subset of the garment points being in the first subgroup of cross pairs that is allocated to the first core;

determine, using the vector execution units in parallel based on the organized data layout, that boundaries of the first subgroup of cross pairs overlap based on the one or more exerted forces on the subset of the garment points; and calculate one or more simulated forces acting on the subset of the garment points based on the determining of whether the boundaries of the first subgroup of cross pairs overlap.

2. The system of claim 1, wherein the organizing the data layout includes:

arranging the one or more exerted forces on the garment points in the first subgroup of cross pairs into a structure-of-array format;

consecutively numbering left indices of edges corresponding to the subset of the garment points based on the quantity of vector execution units; and consecutively numbering right indices of the edges corresponding to the subset of the garment points based on the quantity of vector execution units.

3. The system of claim 2, wherein the plurality of vector execution units is a single instruction multiple data (SIMD), and wherein the quantity corresponds to a width of the SIMD.

4. The system of claim 1, wherein the garment simulation module is further configured to:

calculate, using the vector execution units in parallel based on the quantity of vector execution units, the one or more exerted forces being exerted on the subset of the garment points based on exerted forces by garment points adjacent to the subset of the garment points.

5. The system of claim 4, wherein the exerted one or more forces is calculated based on velocities associated with the garment points adjacent to the subset of the garment points.

6. The system of claim 1, wherein the generated cross pairs are apportioned in equal quantity to each core of the plurality of cores.

7. The system of claim 1, wherein the garment simulation module is further configured to:

perform, using the plurality of cores in parallel, a hierarchy intersection test on the generated cross pairs;

perform, using the plurality of vector execution units in parallel, an overlap test for the generated cross pairs; and detect a collision based on the hierarchy intersection test and the overlap test.

8. The system of claim 7, wherein a collision is detected if a garment point and a point in the generated cross pairs have overlapping bounding boxes.

9. The system of claim 1, wherein the generating the cross pairs includes:

generating a first hierarchy of nodes corresponding to the garment points; and combining the first hierarchy of nodes with a second hierarchy of nodes corresponding to the three-dimensional model, a cross pair from the generated cross pairs having a first node from the first hierarchy of nodes and a second node from the second hierarchy of nodes.

10. The system of claim 9, wherein the second hierarchy is associated with edges of a garment mesh.

11. The system of claim 9, wherein the second hierarchy is associated with triangles of a garment mesh.

12. The system of claim 9, wherein a boundary of the cross pair is overlapping if a first boundary from the first node and a second boundary from the second node are overlapping.

13. The system of claim 9, wherein the second hierarchy is associated with a second subset of the garment points.

14. The system of claim 1, wherein the second three-dimensional model is a three-dimensional body model of a human body.

15. The system of claim 1, wherein the second three-dimensional model is a second garment model of a second garment.

16. The system of claim 1, wherein the second point is associated with a vertex of a garment mesh.

17. The system of claim 1, further comprising a rendering module configured to:

generate a first image of the first three-dimensional garment model draped on a three-dimensional body model based on the calculated one or more simulated forces; and present the generated image on a display of a device.

18. The system of claim 17, wherein the first three-dimensional body model has a first body position, and wherein the garment simulation module is further configured to:

change the first three-dimensional body model to a second body position;

reposition at least a portion of the first three-dimensional body model inside the garment points based on the change of the first three-dimensional body model to the second body position; and calculate, using the plurality of cores in parallel and the plurality of vector execution units in parallel, one or more second simulated forces acting on a second subset of the garment points based on the repositioning.

19. A method comprising:

accessing, from a database, a first three-dimensional garment model of a garment, the first three-dimensional garment model including garment points that represent a surface of the garment; and generating cross pairs, using a processor having a plurality of cores, a cross pair among the cross pairs being generated by combining a garment point from the garment points with a second point from a second three-dimensional model;

apportioning the generated cross pairs among the plurality of cores, a first subgroup of cross pairs from the generated cross pairs being allocated to a first core from the plurality of cores, the first core having a quantity of vector execution units;

organizing a data layout of one or more exerted forces being exerted on a subset of the garment points based on the quantity of vector execution units, the subset of the garment points being in the first subgroup of cross pairs that is allocated to the first core;

determining, using the vector execution units in parallel based on the organized data layout, that boundaries of the first subgroup of cross pairs overlap based on the one or more exerted forces on the subset of the garment points; and calculating one or more simulated forces acting on the subset of the garment points based on the determining of whether the boundaries of the first subgroup of cross pairs overlap.

20. A non-transitory machine-readable storage medium comprising instructions that, when executed by one or more processors of a machine, cause the machine to perform operations comprising:
- accessing, from a database, a first three-dimensional garment model of a garment, the first three-dimensional garment model including garment points that represent a surface of the garment; and
- generating cross pairs, using a processor having a plurality of cores, a cross pair among the cross pairs being generated by combining a garment point from the garment points with a second point from a second three-dimensional model;
- apportioning the generated cross pairs among the plurality of cores, a first subgroup of cross pairs from the generated cross pairs being allocated to a first core from the plurality of cores, the first core having a quantity of vector execution units;
- organizing a data layout of one or more exerted forces being exerted on a subset of the garment points based on the quantity of vector execution units, the subset of the garment points being in the first subgroup of cross pairs that is allocated to the first core;
- determining, using the vector execution units in parallel based on the organized data layout, that boundaries of the first subgroup of cross pairs overlap based on the one or more exerted forces on the subset of the garment points; and
- calculating one or more simulated forces acting on the subset of the garment points based on the determining of whether the boundaries of the first subgroup of cross pairs overlap.

* * * * *